(12) United States Patent
Nakajima et al.

(10) Patent No.: US 7,345,803 B2
(45) Date of Patent: Mar. 18, 2008

(54) OPTICAL MODULATOR AND OPTICAL MODULATING METHOD

(75) Inventors: Hiroki Nakajima, Kanagawa (JP); Takayuki Yamanaka, Kanagawa (JP); Hideki Fukano, Kanagawa (JP); Yuichi Akage, Kanagawa (JP); Munehisa Tamura, Chiba (JP); Tadashi Saitoh, Osaka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 272 days.

(21) Appl. No.: 10/547,906

(22) PCT Filed: Mar. 18, 2005

(86) PCT No.: PCT/JP2005/004958

§ 371 (c)(1),
(2), (4) Date: Sep. 6, 2005

(87) PCT Pub. No.: WO2005/091056

PCT Pub. Date: Sep. 29, 2005

(65) Prior Publication Data

US 2006/0171011 A1 Aug. 3, 2006

(30) Foreign Application Priority Data

Mar. 18, 2004 (JP) ............................. 2004-077704

(51) Int. Cl.
*G02F 1/00* (2006.01)
*G02F 1/03* (2006.01)
*G02F 1/01* (2006.01)
*G02F 1/035* (2006.01)

(52) U.S. Cl. ...................... 359/237; 359/239; 359/245; 385/1; 385/2; 385/3; 372/26; 372/36; 372/38.1; 342/60; 342/200

(58) Field of Classification Search .............. 359/237, 359/239, 245, 563; 385/1–4, 14, 88, 92, 385/129; 372/26, 28, 36, 38.1, 38.08, 43, 372/108; 342/60, 160, 200, 367; 455/248.1, 455/520; 398/209, 212; 702/77; 331/83, 331/88, 92, 176, 181; 332/133, 142, 165; 333/33, 214, 81 B
See application file for complete search history.

(56) References Cited

U.S. PATENT DOCUMENTS 2,914,761 A * 11/1959 Ortusi et al. ................ 342/200
4,850,667 A * 7/1989 Djupsjobacka ................ 385/3

(Continued)

FOREIGN PATENT DOCUMENTS

JP    07098442    11/1995

(Continued)

OTHER PUBLICATIONS

Electric Letters 1st May 2003, vol. 39 No. 9, pp. 733-735.

(Continued)

*Primary Examiner*—Loha Ben
(74) *Attorney, Agent, or Firm*—Blakely, Sokoloff, Taylor & Zafman

(57) ABSTRACT

In an optical modulation device (10) having an electrical/optical interaction region (11), an electrical signal line (3) is connected to an electrical signal input terminal (2a), another electrical signal line (4a) is connected to an electrical signal output terminal (2b), and a reflection control circuit (5) is connected to the other electrical signal line (4a). This reflection control circuit (5) is an impedance element which positively reflects an output electrical signal from the interaction region (11) of the optical modulation device (10). This makes it possible to raise the upper-limiting frequency at which the E/O (Electrical-to-Optical) response characteristic can be improved, and improve the flatness of the frequency characteristic of the E/O response without deteriorating the absolute value of the E/O response.

16 Claims, 19 Drawing Sheets

U.S. PATENT DOCUMENTS

| | | | |
|---|---|---|---|
| 6,687,039 B2* | 2/2004 | Shirai | 359/254 |
| 6,836,492 B2* | 12/2004 | Ido et al. | 372/36 |
| 2003/0007228 A1 | 1/2003 | Shirai | |
| 2004/0001242 A1 | 1/2004 | Shigeta et al. | |

FOREIGN PATENT DOCUMENTS

| | | |
|---|---|---|
| JP | 11-183858 A | 7/1999 |
| JP | 2000-156612 A | 6/2000 |
| JP | 2003-115719 A | 4/2003 |

OTHER PUBLICATIONS

Shirai et al., "Electrically impedance-matched modulator for 40Gbit/s transmissions at 1.3 μm", Proceedings of the 2002 IEICE Society Conference, SC-2-3, pp. 311-312.

Thach G. Nguyen et al., "Re-photonic Link Using A Resonantly-Enhanced Mach-Zehnder Optical Modulator", School of Electric and Computer Engineering, RMIT University, Oct. 12, 2005 (4 pages).

Y.S. Visagathilagar et al., "Fabry-Perot Type Resonantly Enhanced Mach-Zehnder Modulator", Department of Communication and Electronic Engineering, RMIT University, W-2.3, MWP99 Digest, Nov. 17, 1999, pp. 17-20.

Hsu-Feng Chou et al., "Standing-Wave Enhanced Electroabsorption Modulator for 40-GHz Optical Pulse Generation", IEEE Photonics Technology Letters, vol. 15, No. 2, Feb. 2003, pp. 215-218.

\* cited by examiner

OPTICAL MODULATOR AND OPTICAL MODULATING METHOD

The present application is a non-provisional application of International Application No. PCT/JP2005/004958, filed Mar. 18, 2005.

TECHNICAL FIELD

The present invention relates to an optical modulator which modulates an input optical signal by using an electrical signal, and outputs the modulated optical signal.

BACKGROUND ART

Optical modulators are generally devices which change (modulate) the intensity, phase, polarized state, wavelength/frequency, traveling direction, and the like of an optical signal which carries information by using, e.g., external electric, magnetic, mechanical, acoustic, and optical means. Of these devices, a device which modulates the intensity or phase of an optical signal by using an electric means is conventionally widely used from the viewpoints of the operation speed (operation bandwidth) and controllability.

Typical examples of the device which modulates the intensity of light are an electroabsorption modulator which modulates the intensity of light (transmits or absorbs light) which propagates in a material forming the device by controlling the light absorption coefficient of the material by applying an electric field to the device, and a Mach-Zehnder modulator which replaces a refractive index change of a device material caused by field application and a consequence phase change of an optical signal with an intensity change by using the interference effect of a Mach-Zehnder interferometer.

Although the electroabsorption modulator and Mach-Zehnder modulator use different physical phenomena as device operating mechanisms, the both are devices having an aspect as an optical device including optical signal input and output terminals and an aspect as an electric device including electrical signal input and output terminals, when they are regarded as devices which input a modulation electrical signal and outputs a modulated optical signal. The ratio of the modulation of the intensity of an optical signal described above, i.e., the extinction ratio, is one important performance index of the optical modulator from the viewpoint of the aspect as an optical device.

On the other hand, when the operation bandwidth of the optical modulator is taken into consideration, the aspect as an electric device should be noted. For example, the conventional electroabsorption modulator has an electrode structure in which the operation bandwidth of the device is limited by a CR time constant where C is a device capacitance as a lumped element and R is a load resistance. In this case, the device capacitance must be reduced to enlarge the operation bandwidth of the device. However, if, for example, the device length (the length in a direction in which an optical signal propagates) is shortened to reduce the device capacitance, the extinction ratio decreases. Also, if, for example, the device thickness (the length in a direction in which the electric field of an electrical signal is applied) is increased, the driving voltage increases.

It is, therefore, recently proposed to greatly alleviate the bandwidth limitation by the CR time constant described above by changing the electrode structure of the device from the lumped-element type to a traveling-wave type (distributed-element type). The traveling-wave type electrode structure is a structure in which an electrode for an electric signal (microwave) is formed into a distributed-element type transmission line such as a coplanar line or microstrip line, and this transmission line and an optical signal waveguide are formed parallel to each other. In this structure, the operation bandwidth of the device is presumably determined by a phase speed difference between an electrical signal and optical signal which propagate in the device, so characteristics over an extremely wide band can be expected. In effect, ultra-wide-band characteristics by which the 3-dB-down bandwidth of the E/O (Electrical-to-Optical) response is, e.g., 50 GHz or more is realized by the traveling-wave type electrode structure device.

As described above, the traveling-wave type electrode structure device propagates an electrical signal on a transmission line, and a transmission line generally has a characteristic impedance ($Z_0$), so it is essential to match the characteristic impedance of the line with the impedance of a terminating resistor of an electrical signal driving system in order to efficiently transmit an electrical signal. A standard electrical signal driving system is a 50-$\Omega$ system (i.e., the terminating resistor is 50 $\Omega$).

When the traveling-wave type electrode structure optical modulator is regarded as an electric device having a transmission line, its characteristic impedance $Z_0$ is typically about 25 $\Omega$, so it looks like a low-impedance line from the 50-$\Omega$ driving system, and this produces impedance mismatching. If this impedance mismatching occurs, a portion of a modulation electrical signal as a microwave is reflected when the signal is input to the optical modulator, so the external input microwave is not efficiently supplied to an electrical/optical interaction region in the optical modulator. This consequently deteriorates the flatness of the frequency characteristic or decrease the 3-dB-down bandwidth of the E/O response.

As a method of improving the problem of impedance mismatching in the optical modulator, an arrangement in which, as shown in FIG. 30, an electrical signal line 3 which connects an electrical/optical interaction region 11 in an optical modulation unit 10 and an input terminating resistor 81 and an electrical signal line 4 which connects the electrical/optical interaction region 11 and an output terminating region 91 are high-impedance lines having a characteristic impedance $Z_0$ of about 100 $\Omega$ is proposed (Electronic Letters 1st May 2003, Vol. 39 No. 9, pp. 733-735).

In this arrangement, when the low-impedance line ($Z_0$ of about 25 $\Omega$) of the optical modulation unit 10 and the high-impedance line ($Z_0$ of about 100 $\Omega$) connected in series with the low-impedance line is considered to be one device as a whole, the effective characteristic impedance can be regarded as the average value of the characteristic impedances of the individual lines, so impedance matching with the 50-$\Omega$ driving system is possible. Since this reduces an input reflection coefficient (S11) and output reflection coefficient (S22) with respect to the microwave, and the microwave input from the input terminating side of the electrical signal driving system (driver circuit) to the optical modulator is efficiently transmitted to the output terminating side of the electrical signal driving system, the efficiency of application of the microwave voltage to the electrical/optical interaction region in the optical modulator increases. As a consequence, it is possible to improve the flatness of the frequency characteristic of the E/O response.

As another method of improving the flatness of the frequency characteristic of the E/O response, an arrangement which makes the value of the output terminating resistor (load resistor) smaller than the value of the characteristic impedance of the optical modulator is proposed (e.g., Japanese Patent Laid-Open No. 11-183858). This method in which the value of the output terminating resistor is made different from the value of the characteristic impedance of the optical modulator intentionally produces impedance mismatching on the output terminating side of an electrical signal, and uses, as electrical signals to be applied to the electrical/optical interaction region in the optical modulator, not only an incident electrical signal from the driver circuit but also a reflected electrical signal generated by the impedance mismatching on the output terminating side. This makes it possible to control the profile (form) of the frequency characteristic of the E/O response, improve the flatness, and increase the 3-dB-down bandwidth.

DISCLOSURE OF INVENTION

Problems to be Solved by Invention

In the impedance matching technique using the series connection of the high-impedance line described above, the wavelength of an input electrical signal must be longer than the physical length of the whole device including both the optical modulation unit as the low-impedance line and the high-impedance line. This is so because if the electrical signal wavelength is equal to or shorter than the physical length of the whole device, the effective characteristic impedance of the whole device cannot be regarded as the average value of the characteristic impedances of the individual lines any longer.

Accordingly, the impedance matching technique using the series connection of the high-impedance line has the problem that the wavelength of an applicable electrical signal has its lower limit, in other words, the frequency of an applicable electrical signal has its upper limit. In effect, the E/O response characteristic improves by the series connection of the high-impedance line when the frequency of an input microwave is about 25 GHz or less, and the E/O response characteristic abruptly deteriorates for input microwaves having higher frequencies.

Also, in the impedance mismatching technique using the reduction in output terminating resistor value, the flatness of the frequency characteristic of the E/O response improves, but this is achieved by decreasing the absolute value of the E/O response on the low-frequency side, thereby decreasing a relative difference from the absolute value of the E/O response on the high-frequency side. The decrease in absolute value of the E/O response means deterioration of the dynamic extinction ratio, and hence is undesirable.

It is, therefore, a principal object of the present invention to provide an optical modulator capable of raising the upper-limiting frequency of the E/O response characteristic of an optical modulator.

It is another object of the present invention to provide an optical modulator capable of flattening the frequency characteristic without deteriorating the absolute value of the E/O response.

Means for Solving the Problem

To achieve the above objects, an optical modulator according to the present invention is characterized by comprising an optical modulation device having optical signal input and output terminals, electrical signal input and output terminals, and an electrical/optical interaction region in which input optical and electrical signals interact with each other, an electrical signal line connected to the electrical signal output terminal, and a refection control circuit connected to the electrical signal line, the reflection control circuit comprising an impedance element which positively reflects the electrical signal output from the interaction region of the optical modulation device.

Effects of Invention

In the present invention, the impedance element which promotes the reflection of a modulation electrical signal is connected to the electrical signal line which electrically connects the electrical/optical interaction region and an output terminating resistor, thereby raising the upper-limiting frequency at which the E/O (Electrical-to-Optical) response characteristic is improvable, and improving the flatness of the frequency characteristic of the E/O response without deteriorating its absolute value.

Conventionally, to widen the operation bandwidth of, e.g., the electroabsorption modulator, it is essential to shorten the device length for the purpose of reducing the device capacitance, but reducing the device length inevitably lowers the extinction ratio. In the present invention, however, it is possible to eliminate this tradeoff relationship, and independently control and design the operation bandwidth and extinction ratio of an optical modulator.

In the present invention, reactance component X or electric resistance component R (more generally, impedance $Z=R+jX$ where j is an imaginary unit) is connected in parallel to the electrical signal line which connects the electrical/optical interaction region of the optical modulator and the output terminating resistor of the electrical signal driving system, thereby increasing the degree of freedom for controlling the reflection of an input electrical signal to the optical modulator or an output electrical signal from it. This greatly increases the degree of freedom of design in the response characteristic of an output (modulated) optical signal with respect to an input (modulation) electrical signal.

In the impedance matching technique using the series connection of the high-impedance line described above, the degree of freedom for controlling the reflection of an electrical signal is obtained only for the characteristic impedance value and line length of the electrical signal line which connects the electrical/optical interaction region of the optical modulator and the terminating resistor. Also, in the impedance mismatching technique using the reduction in terminating resistance value described above, the degree of freedom for controlling the reflection of an electrical signal is obtained only for the value of the output terminating resistor connected in series with the electrical signal line. That is, in the conventional technique, the degree of freedom for controlling the reflection of an electrical signal is obtained only for an element connected in series with the electrical signal line which connects the electrical/optical interaction region of the optical modulator and the terminating resistor. By contrast, the present invention increases the degree of freedom for controlling the reflection of an electrical signal by using an element connected in parallel to the electrical signal line as well.

In addition, the control of the reflection of an electrical signal in the present invention includes not only simple suppression of the reflection of an electrical signal, i.e., impedance matching, but also promotion of the reflection of an electrical signal, i.e., impedance mismatching. More specifically, an impedance is connected in parallel to the electrical signal line which connects the electrical/optical interaction region of the optical modulator and the output terminating resistor, and this increases the reflection coefficient of an electrical signal, when compared to a case in which this impedance is not connected, in at least a certain frequency region. The present invention improves the response characteristic of an output (modulated) optical signal with respect to an input (modulation) electrical signal by using the promotion of the reflection of an electrical signal (the generation of a reflected electrical signal) as described above, and the parallel impedance (the parallel reactance, the parallel electric resistance) in the present invention achieves a function different from that of normal impedance matching (the suppression of the reflection of an electrical signal.

Note that even when an inductive reactance is connected in series with the electrical signal line which connects the electrical/optical interaction region of the optical modulator and the output terminating resistor, the output reflection coefficient of an electrical signal increases, when compared to a case in which no inductive reactance is connected, in at least a certain frequency region.

BEST MODE FOR CARRYING OUT THE INVENTION

Embodiments of the present invention will be described in detail below with reference to the accompanying drawings.

Figure 1:
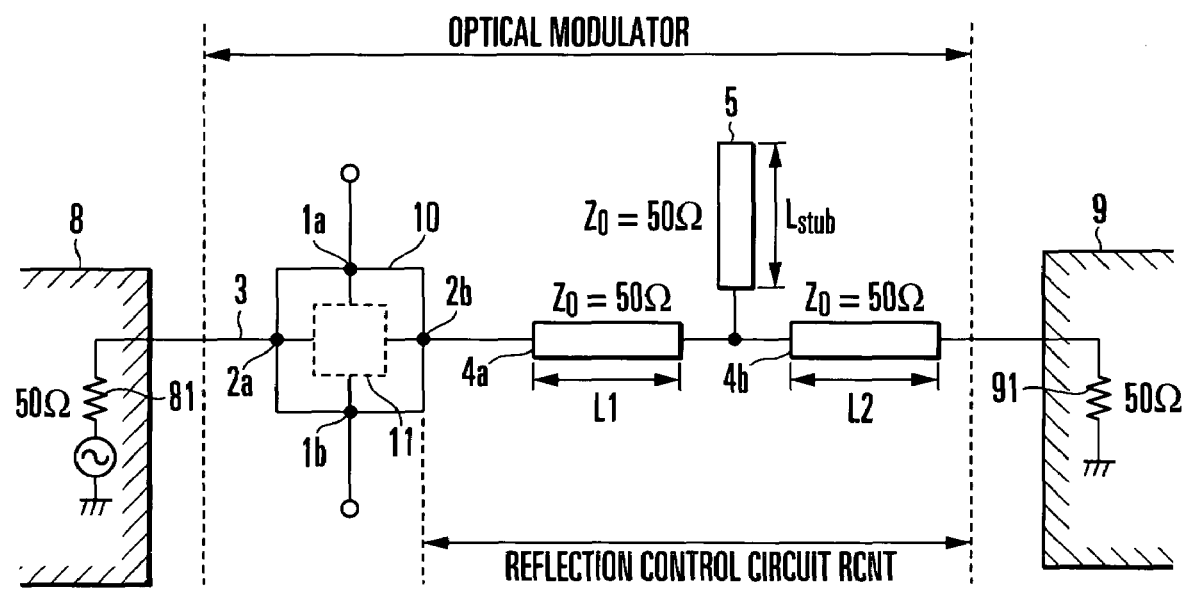
FIG. 1 is a view showing the arrangement of the first embodiment of an optical modulator according to the present invention.

The present invention is characterized in that a reflection control circuit is connected to a second electrical signal line 4a which is connected to the electrical signal output side of an optical modulation device 10 shown in FIG. 1.

First Embodiment

FIG. 1 shows the first embodiment of an optical modulator of the present invention, and this optical modulator has an optical modulation device 10 including an optical signal input terminal 1a, an optical signal output terminal 1b, an electrical signal input terminal 2a, an electrical signal output terminal 2b, and an electrical/optical interaction region 11 in which input optical and electrical signals interact with each other.

Also, a first electrical signal line 3 is connected to the electrical signal input terminal 2a of the optical modulation device 10 described above, and a second electrical signal line 4a which forms a part of a refection control circuit RCNT is connected to the electrical signal output terminal 2b.

An (equivalent) input terminating resistor 81 on the input terminating side 8 of an electrical signal driving system is connected to the first electrical signal line 3.

The reflection control circuit RCNT is placed between the optical modulation device 10 and an output terminating resistor 91, and positively reflects an output electrical signal from the optical modulation device 10. The reflection control circuit includes an impedance element 5 which is parallel to the second electrical signal line 4a. In each embodiment to be described below, signal lines will be explained where necessary.

Figure 2:
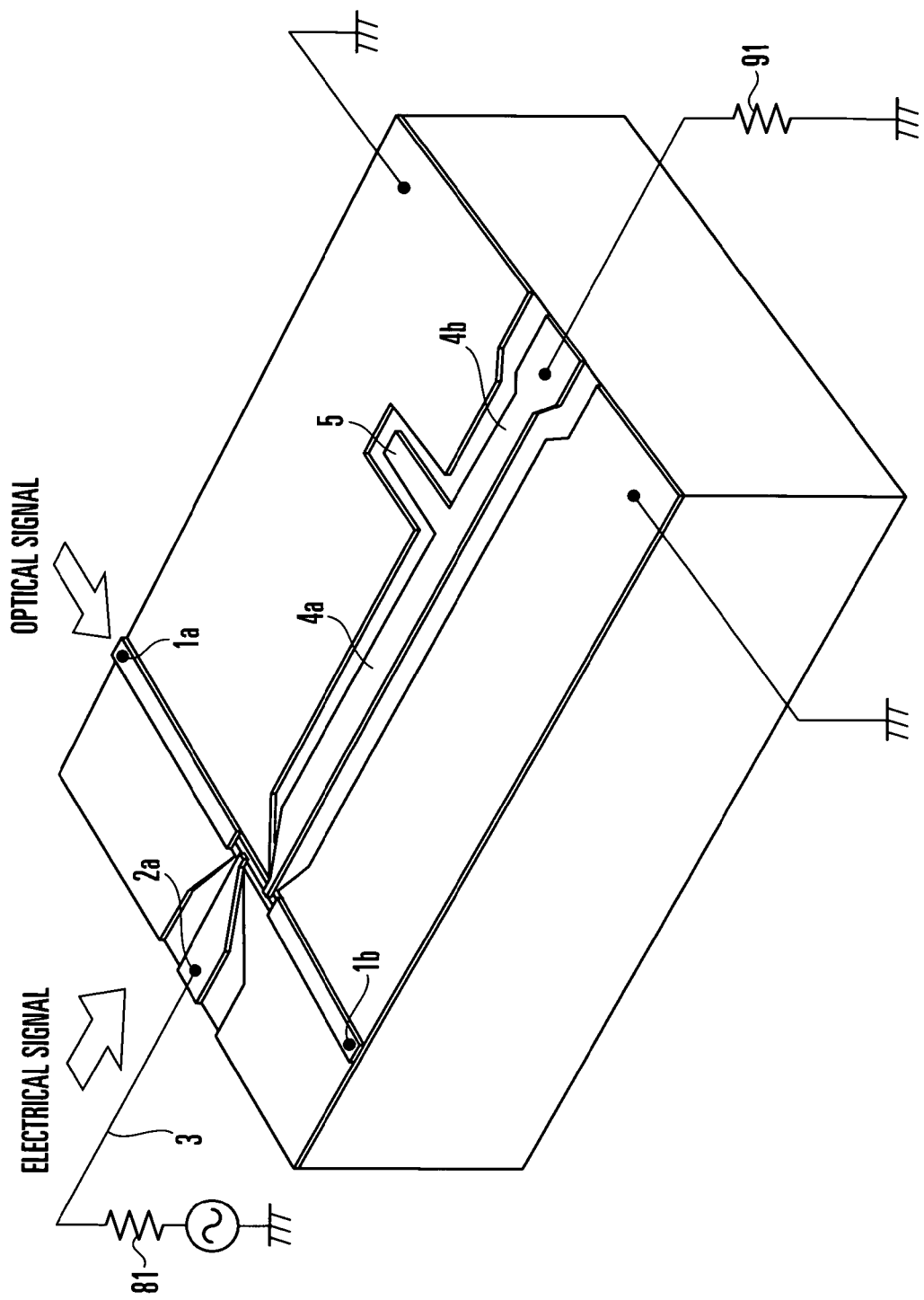
FIG. 2 is a perspective view showing a practical structure of FIG. 1.

The second electrical signal line 4a is connected to the impedance element 5 of the reflection control circuit RCNT characterized by the present invention, and connected to the output terminating resistor 91 on the output terminating side 9 of an electrical signal driving system via an electrical signal line 4b. FIG. 2 shows a practical structure of an electroabsorption modulator having a traveling-wave type electrode structure, in which both the electrical signal lines 4a and 4b are coplanar lines formed on a semi-insulating InP substrate. In this embodiment, the optical modulation device 10 and reflection control circuit RCNT are integrated.

In addition, the electrical/optical interaction region 11 forming the optical modulation device 10 modulates an optical signal supplied from the optical signal input terminal 1a in accordance with an electrical signal supplied to the electrical signal input terminal 2a. The electrical/optical interaction region 11 has, e.g., a stacked structure of n-InP/MQW/p-InP (MQW is a multiple quantum well structure of InGaAlAs/InAlAs) formed on a semi-insulating InP substrate.

Also, as described above, the impedance element 5 of the reflection control circuit RCNT is connected to the second electrical signal line 4a. The reflection control circuit RCNT is generally formed by an impedance component. In this embodiment, the impedance component is a reactance component connected between the line and the ground.

In this optical modulator, a modulation electrical signal generated on the input terminating side 8 of the electrical signal driving system is input to the optical modulation device 10 via the first electrical signal line 3, modulates an input optical signal from the optical signal input terminal 1a in the electrical/optical interaction region 11, and is output as a modulated optical signal from the optical signal output terminal 1b. The modulation electrical signal is transmitted to the output terminating side 9 of the electrical signal driving system via the second electrical signal line 4a and the impedance element 5 of the reflection control circuit RCNT.

The reactance component described above assumes an open-end stub (open stub) formed by a transmission line. Letting $Z_0$ be the characteristic impedance of the line forming the stub and $\theta$ be the electrical length, an impedance Z when viewed from the second electrical signal line 4a as a main line is $$Z = -jZ_0 \cot \theta \quad (1)$$

where j is an imaginary unit. As is apparent from equation (1), the impedance of the open-end stub when viewed from the main line is a pure imaginary number, so the open-end stub has a pure reactance component.

Figure 3A:
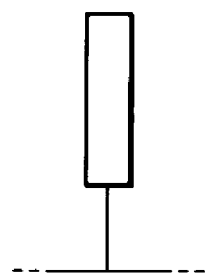
FIG. 3A is a view showing an open-end stub structure.
Figure 3B:
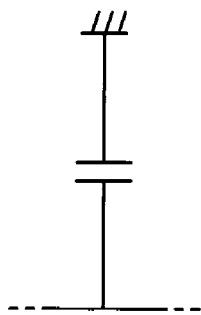
FIG. 3B is a view showing a grounded capacitor.
Figure 3C:
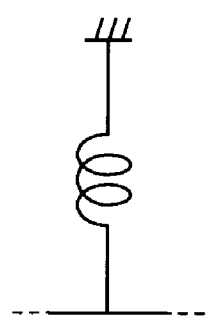
FIG. 3C is a view showing a grounded inductor.

Note that the reactance component of the open-end stub is a periodic function of the electrical length $\theta$, and hence becomes negative (capacitive) or positive (inductive) in accordance with the frequency of an electrical signal. Therefore, in accordance with the frequency used or the microwave reflection characteristic of the optical modulator, as shown in FIG. 3B or 3C, a capacitor or inductor as a lumped element having a pure reactance component may also be connected in parallel, in place of the open-end stub (FIG. 3A). Alternatively, a short-end stub (short stub) structure may be used instead of the open-end stub structure.

When the inductor or short-end stub structure is to be used, a capacitor for inhibiting a direct current may also be inserted if necessary.

Figure 4:
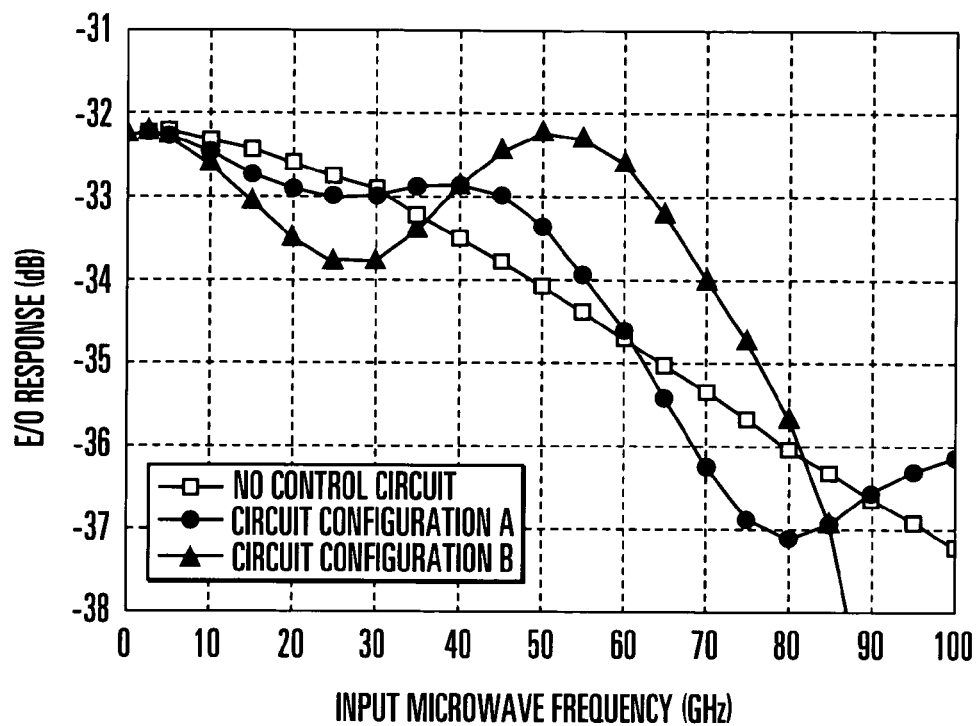
FIG. 4 is a graph showing the frequency dependence of the E/O response of the optical modulator according to the first embodiment.

FIG. 4 shows the results of frequency characteristic simulation of the E/O (Electrical-to-Optical) response in the arrangement shown in FIG. 1, i.e., in a case in which the impedance element 5 of the reflection control circuit RCNT for controlling the reflection of an electrical signal is connected to the electrical signal output side of the optical modulation device 10. That is, FIG. 4 shows the frequency dependence of the E/O response of the optical modulator of this embodiment.

In this simulation, an electroabsorption modulator having a traveling-wave type electrode structure in which the length of the electrical/optical interaction region 11 was 100 μm was assumed as the optical modulation device 10, and the values of both the input terminating resistor 81 and output terminating resistor 91 were set at 50 Ω. Also, all of the electrical signal lines 4a and 4b and the impedance component (open-end stub) 5 forming the reflection control circuit RCNT were coplanar lines having characteristic impedance $Z_0$=50 Ω, and the line lengths were changed two ways as follows. Circuits including the electrical signal lines 4a and 4b and impedance component having these two sets of line lengths will be referred to as circuit configurations A and B hereinafter.

(L1, L2, Lstub)=(650 μm, 100 μm, 100 μm): circuit configuration A (L1, L2, Lstub)=(390 μm, 100 μm, 230 μm): circuit configuration B The electrical signal line 4a and reactance element 5 (open-end stub) formed by coplanar lines can be monolithically integrated on the semi-insulating InP substrate on which the optical modulation device 10 is formed. In this case, the signal line 4a is directly connected to the electrical signal output terminal 2b, which is formed by a coplanar line, of the optical modulation device 10 shown in FIG. 2.

Note that the first electrical signal line 3 was a simple electrical connection in this simulation.

The E/O response characteristics shown in FIG. 4 indicate the results when the frequency of an input microwave is 45 MHz to 100 GHz.

As indicated by blank squares in FIG. 4, the E/O response when the electrical signal reflection control circuit RCNT is not connected at all, i.e., the E/O response of the optical modulation device 10 itself monotonously decreases as the input microwave frequency increases, and the 3-dB-down bandwidth is about 67 GHz.

By contrast, when the reflection control circuit RCNT including the impedance component is connected, the E/O response characteristic can be greatly changed as is well shown in FIG. 4. For example, in circuit configuration A (indicated by solid circles in FIG. 4), the flatness of the E/O response characteristic improves in a region near 20 to 45 GHz. Also, in circuit configuration B (indicated by solid triangles in FIG. 4), the absolute value of the E/O response largely increases in a high-frequency region from 35 to 80 GHz.

Figure 5:
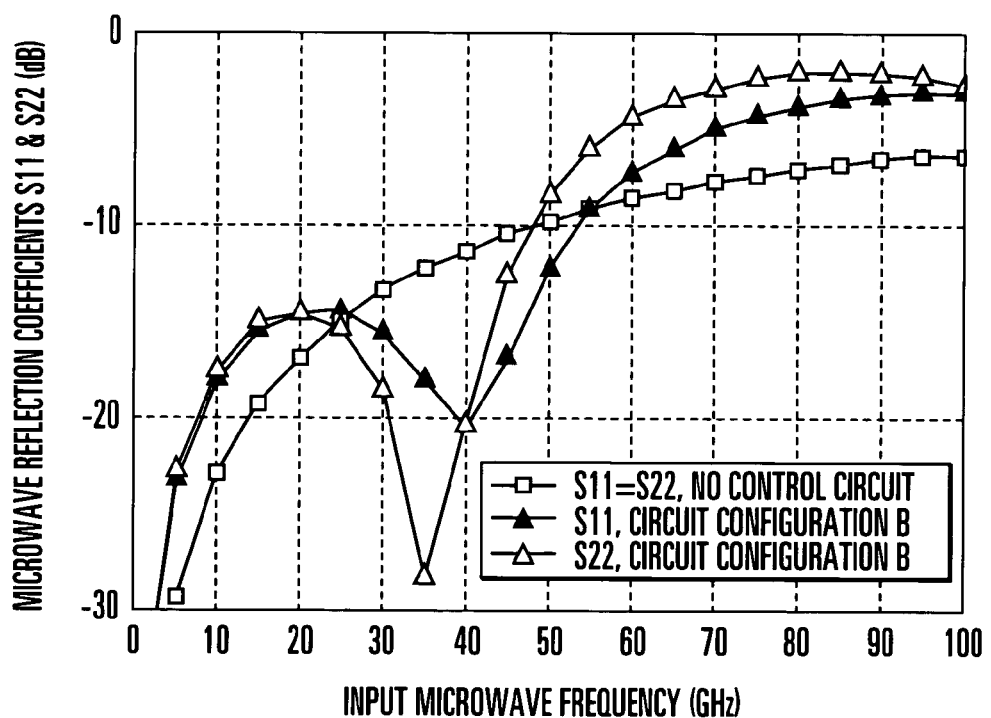
FIG. 5 is a graph showing the frequency dependence of the reflection coefficients of an electrical signal of the optical modulator when a reflection control circuit of circuit configuration B is connected and not connected.

FIG. 5 shows the frequency dependence of an input reflection coefficient S11 and output reflection coefficient S22 of an electrical signal, together with the reflection coefficients when the reflection control circuit RCNT is not connected, in circuit configuration B having a notable peaking effect in the E/O response characteristic. That is, FIG. 5 shows the frequency dependence of the reflection coefficient of an electrical signal when the reflection control circuit RCNT of circuit configuration B is connected and not connected. When the reflection control circuit RCNT is not connected, the device structure is symmetrical with respect to the input and output, so S11=S22. Note that the reference planes of the reflection coefficients are at the input termination and output termination.

In a circuit using the optical modulator, unlike in a normal electrical circuit using transistors and the like, the input reflection coefficient S11 can also be controlled although the reflection control circuit RCNT is connected only to the output side of an electrical signal. As is well shown in FIG. 5, in a region where the input microwave frequency is about 25 to 50 GHz, the values of S11 and S22 when the reflection control circuit RCNT (circuit configuration B) is connected are smaller than the reflection coefficients when the reflection control circuit RCNT is not connected. By reflecting this, the E/O response of circuit configuration B shown in FIG. 4 tends to increase as the frequency rises in the region of 25 to 50 GHz.

Figure 6:
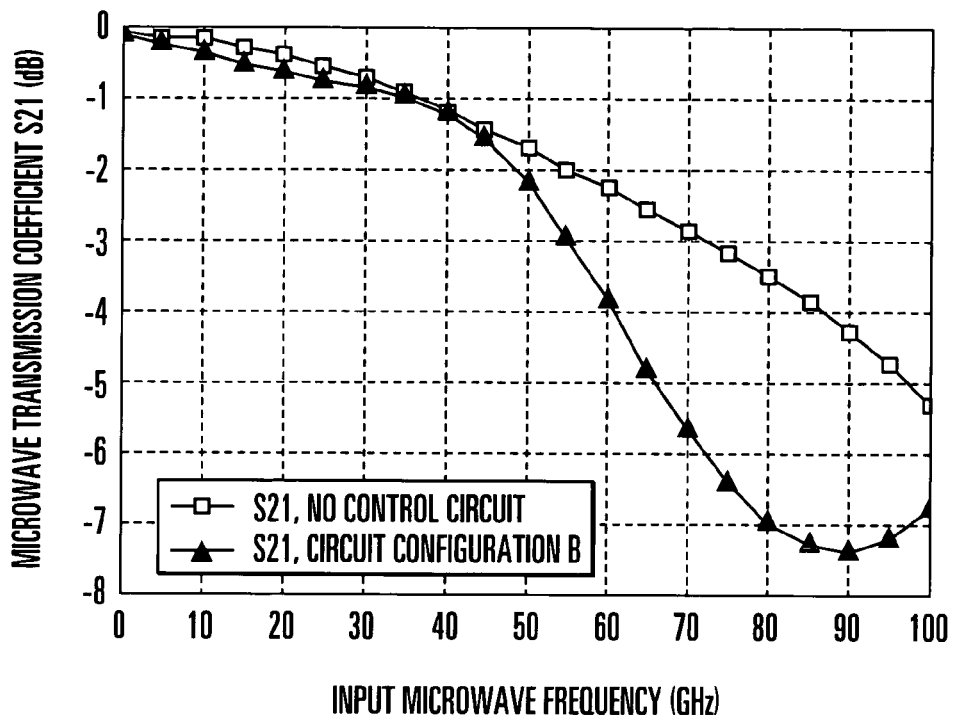
FIG. 6 is a graph showing the frequency dependence of the transmission coefficient of an electrical signal of the optical modulator when the reflection control circuit of circuit configuration B is connected and not connected.

As shown in FIG. 5, at frequencies near 55 GHz at which peaking occurs in the E/O response when circuit configuration B is connected, S11 when circuit configuration B is connected is substantially equal to that when the reflection control circuit RCNT is not connected. Also, the value of S22 when circuit configuration B is connected is larger than that when the reflection control circuit RCNT is not connected. This means that near the frequencies at which peaking occurs in the E/O response, electrical impedance mismatching occurs particularly on the output side. This clearly appears in the frequency dependence of a transmission coefficient S21 of an electrical signal shown in FIG. 6. FIG. 6 shows the frequency dependence of the transmission coefficient of an electrical signal of the optical modulator when the reflection control circuit RCNT of circuit configuration B is connected and not connected.

As is well shown in FIG. 6, the value of S21 when circuit configuration B is connected is evidently lower than the value of S21 when the reflection control circuit RCNT is not connected near 55 GHz by reflecting the impedance mismatching described above.

As described above, the E/O response characteristic can be improved by positively using not only simple impedance matching but also impedance mismatching, i.e., promotion of the reflection of an electrical signal. In circuit configuration B, an output electrical signal from the optical modulation device 10 is reflected toward the optical modulation device 10 (a reflected signal is generated) by the reflection control circuit RCNT, and superposed on a modulation electrical signal generated on the input terminating side 8 of the electrical signal driving system. This consequently increases the efficiency of application of the signal voltage to the electrical/optical interaction region, and realizes peaking in the E/O response on the high-frequency side. The aforementioned conventional impedance mismatching technique which decreases the value of the output terminating resistor cannot improve the E/O response (including the absolute value) on the high-frequency side.

COMPARATIVE EXAMPLE 1

Figure 7:
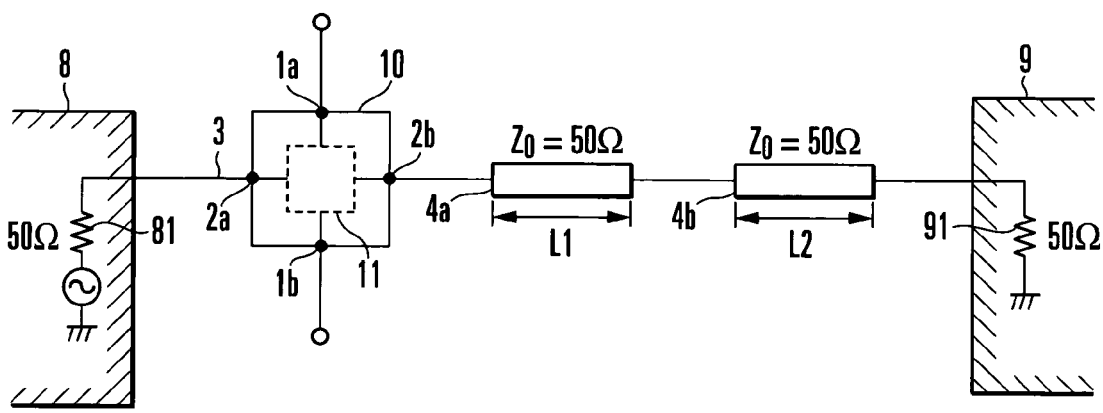
FIG. 7 is a view showing the arrangement of an optical modulator in which a reflection control circuit of circuit configuration C is connected.
Figure 8:
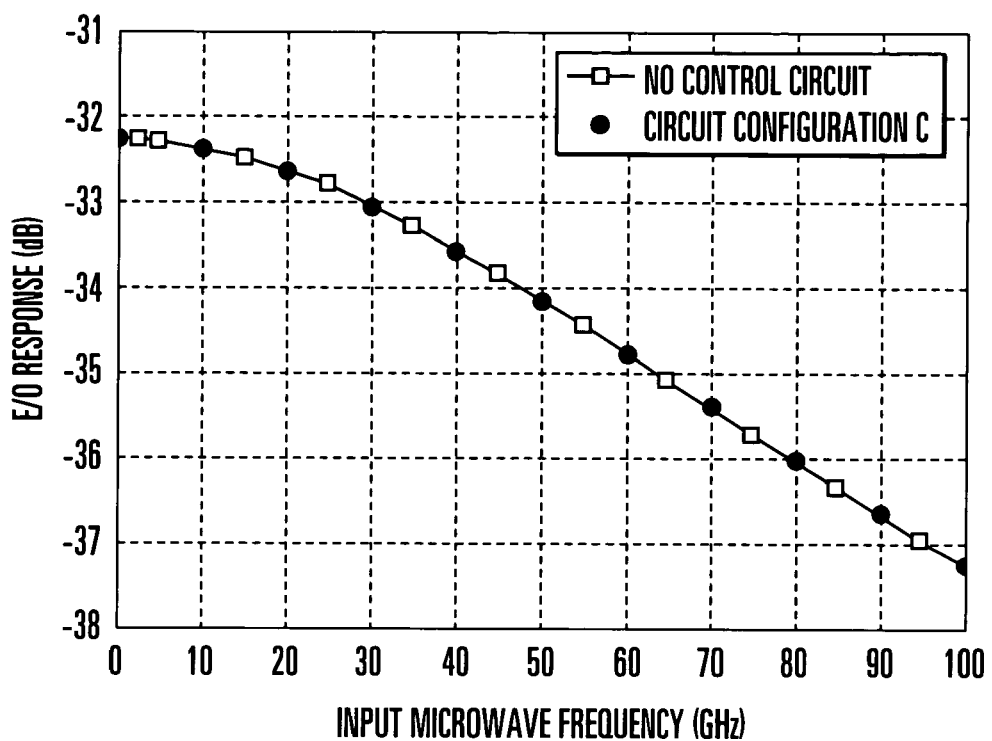
FIG. 8 is a graph showing the frequency dependence of the E/O response of the optical modulator when the reflection control circuit of circuit configuration C is connected and not connected.

To clear up the role of the parallel impedance component according to this embodiment, FIG. 8 shows the frequency characteristic simulation results of the E/O response in an arrangement obtained by removing the reactance component alone from circuit configuration B as shown in FIG. 7, i.e., in circuit configuration C in which the lengths of lines forming a reflection control circuit RCNT are as follows. That is, FIG. 8 shows the frequency dependence of the E/O response of an optical modulator when the reflection control circuit RCNT of circuit configuration C is connected and not connected. (L1, L2, Lstub)=(390 µm, 100 µm, 0 µm): circuit configuration C Note that in the optical modulator shown in FIG. 7, the same reference numerals as in FIG. 1 denote the same components as the optical modulator shown in FIG. 1, and an explanation thereof will be appropriately omitted.

As is well shown in FIG. 8, in circuit configuration C in which the line having characteristic impedance $Z_0$=50 Ω is connected in series, the E/O response does not change at all when compared to the case in which the reflection control circuit RCNT is not connected. This is so because the electrical signal driving system is a 50-Ω system, so the reflection of a microwave is not affected at all even when the line having characteristic impedance $Z_0$=50 Ω is connected in series with this driving system.

The above simulation results demonstrate that the primary factor capable of greatly changing the E/O response characteristic in this embodiment is the parallel impedance component of the reflection control circuit RCNT.

Second Embodiment

The second embodiment of the present invention will be described below with reference to FIG. 9.

In the first embodiment, a reflected electrical signal is generated by connecting the impedance component in parallel to the electrical signal output side of the optical modulation unit. In this embodiment, a reflected electrical signal is generated by connecting an inductive reactance as a reflection control circuit RCNT in series with the electrical signal output side of an optical modulation unit.

Figure 9:
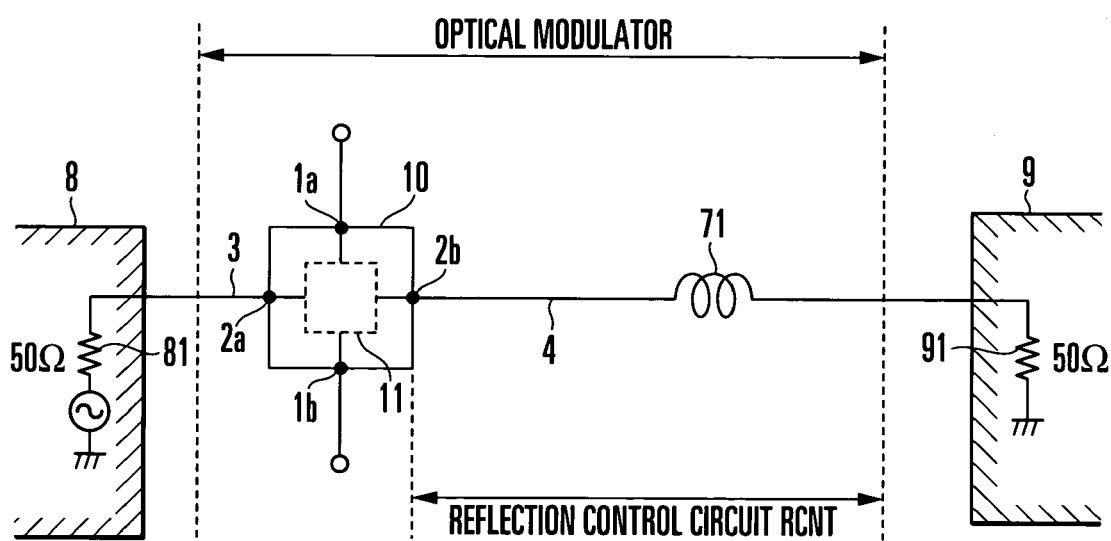
FIG. 9 is a view showing the arrangement of an optical modulator according to the second embodiment.

FIG. 9 shows the arrangement of an optical modulator according to this embodiment, in which the same reference numerals as in FIG. 1 denote the same components as the optical modulator shown in FIG. 1, and an explanation thereof will be appropriately omitted.

As shown in FIG. 9, an element 71 connected in series with a second electrical signal line 4 is an inductor. Letting L be the inductance value and ω be the angular frequency, the element 71 has an inductive reactance component of +ωL. A circuit configuration in which the element 71 is thus connected will be referred to as circuit configuration D hereinafter.

Note that the inductor can be easily realized by a bonding wire or the like.

Figure 10:
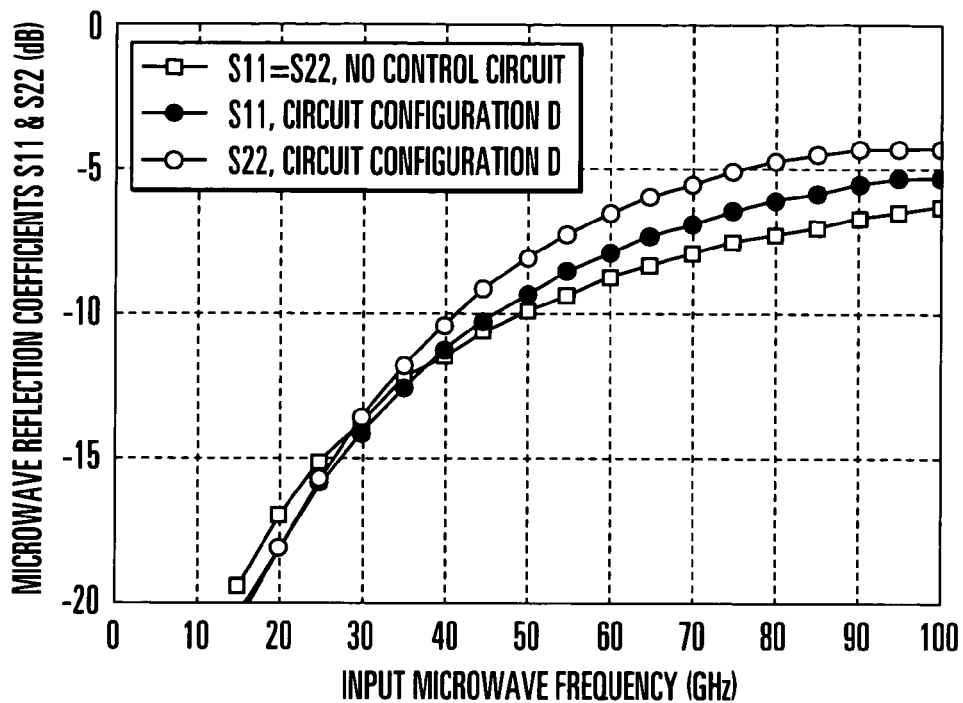
FIG. 10 is a graph showing the frequency dependence of the reflection coefficients of an electrical signal of the optical modulator when a reflection control circuit of circuit configuration D is connected and not connected.

FIG. 10 shows the frequency dependence of an input reflection coefficient S11 and output reflection coefficient S22 of an electrical signal when the inductance value of the element 71 is L=0.04 nH in FIG. 9, together with the reflection coefficients when the element 71 is not connected. That is, FIG. 10 shows the frequency dependence of the reflection coefficients of an electrical signal of the optical modulator when the reflection control circuit RCNT of circuit configuration D is connected and not connected. When the reflection control circuit RCNT is not connected, the device structure is symmetrical with respect to the input and output, so S11=S22.

Figure 11:
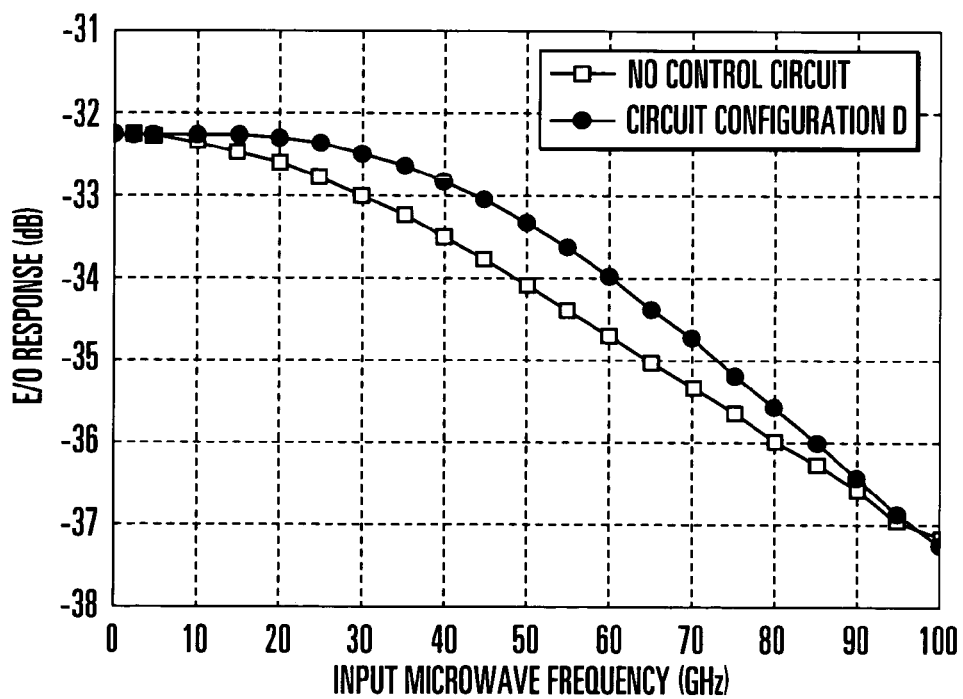
FIG. 11 is a graph showing the frequency dependence of the E/O response of the optical modulator when the reflection control circuit of circuit configuration D is connected and not connected.

As is well shown in FIG. 10, when the reflection control circuit RCNT of circuit configuration D is connected to the optical modulator, i.e., when the inductive reactance is connected in series with the electrical signal output side of an optical modulation device 10, the output reflection coefficient S22 can be increased in a frequency region of about 30 GHz or more, compared to the case in which the reflection control circuit RCNT is not connected. FIG. 11 shows the frequency characteristic simulation results of the E/O response. That is, FIG. 11 shows the frequency dependence of the E/O response of the optical modulator when the reflection control circuit RCNT of circuit configuration D is connected and not connected.

As is well shown in FIG. 11, when the reflection control circuit RCNT of circuit configuration D is connected, the E/O response improves in the frequency region in which the output reflection coefficient S22 increases (the reflected electrical signal increases) in FIG. 10.

Third Embodiment

The third embodiment of the present invention will be described below with reference to FIG. 12.

This embodiment is equivalent to an arrangement in which as a reflection control circuit RCNT, a reactance is connected in parallel to and an element 71 (an inductive reactance) is connected in series with the electrical signal output side of an optical modulation unit, i.e., equivalent to a combination of the first and second embodiments described above.

Figure 12:
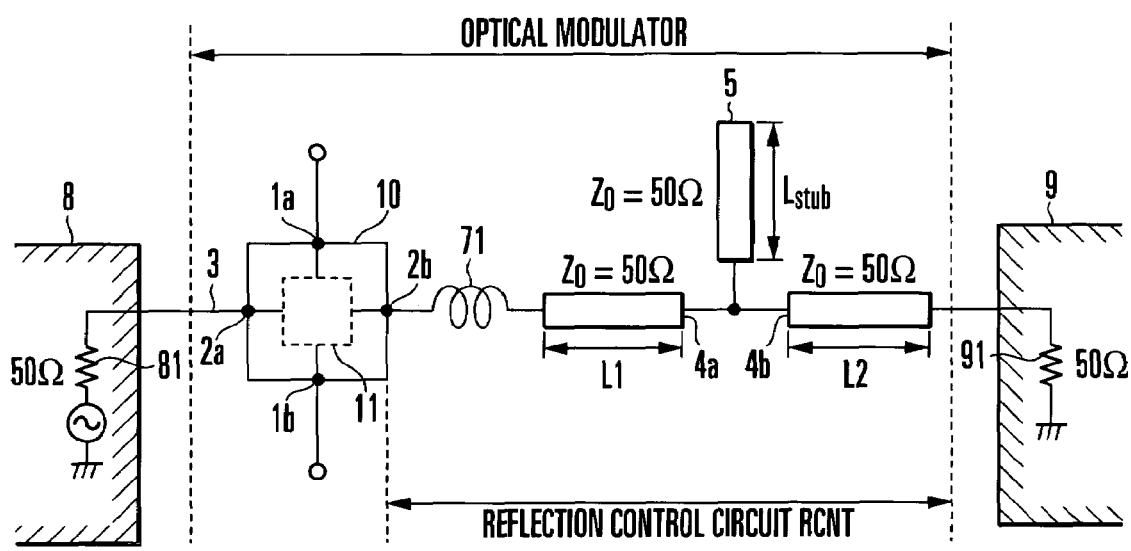
FIG. 12 is a view showing the arrangement of an optical modulator according to the third embodiment.
Figure 13:
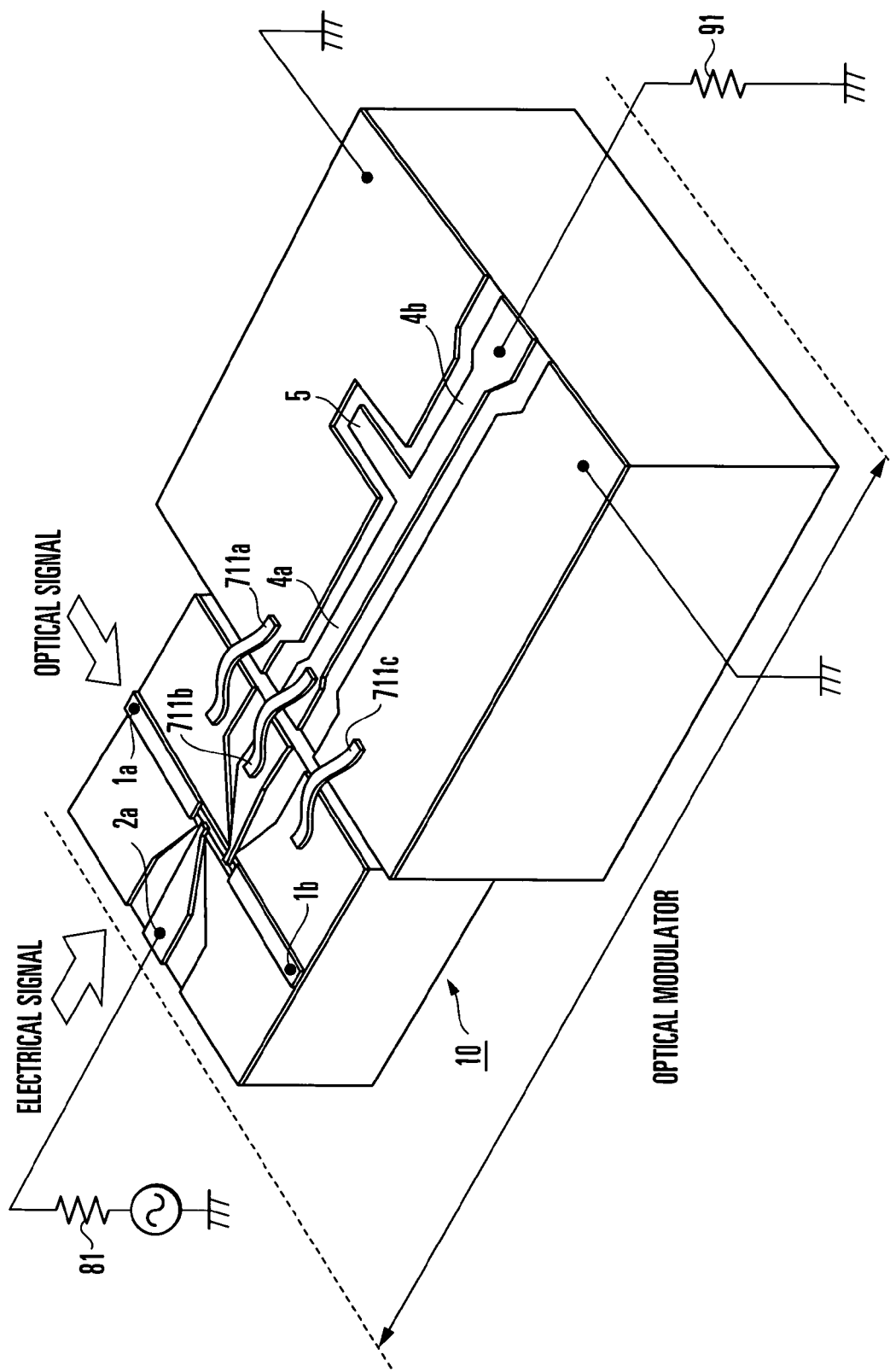
FIG. 13 is a perspective view showing a practical example of the third embodiment.

FIG. 12 shows the arrangement of an optical modulator according to this embodiment, in which the same reference numerals as in FIG. 1 denote the same components as the optical modulator shown in FIG. 1, and an explanation thereof will be appropriately omitted. A practical example is shown in FIG. 13, in which an optical modulation device 10 and the reflection control circuit RCNT are separately formed, and connected by bonding wires 711a to 711c. In this practical example shown in FIG. 13, series transmission lines 4a and 4b and an open-end stub structure 5 are formed by coplanar lines on a semi-insulating InP substrate. The optical modulation device 10 and reflection control circuit RCNT shown in FIG. 2 are monolithically integrated, whereas the optical modulation device 10 and reflection control circuit RCNT of this embodiment are connected by hybrid connection.

Referring to FIG. 12, the element 71 is directly connected to the electrical signal output side of an electrical/optical interaction region 11 of the optical modulator. Letting L be the inductance value and ω be the angular frequency, the element 71 has an inductive reactance component of +ωL.

The inductance value of the element 71 was fixed to L=0.04 nH, and the lengths of the second electrical signal line 4a and a reactance element (open-end stub) as an impedance component formed by coplanar lines having characteristic impedance $Z_0$=50 Ω were changed two ways as follows. Circuits having the second electrical signal line 4a and impedance component (reactance element) having these two sets of line lengths will be referred to as circuit configurations E and F hereinafter.

Figure 14:
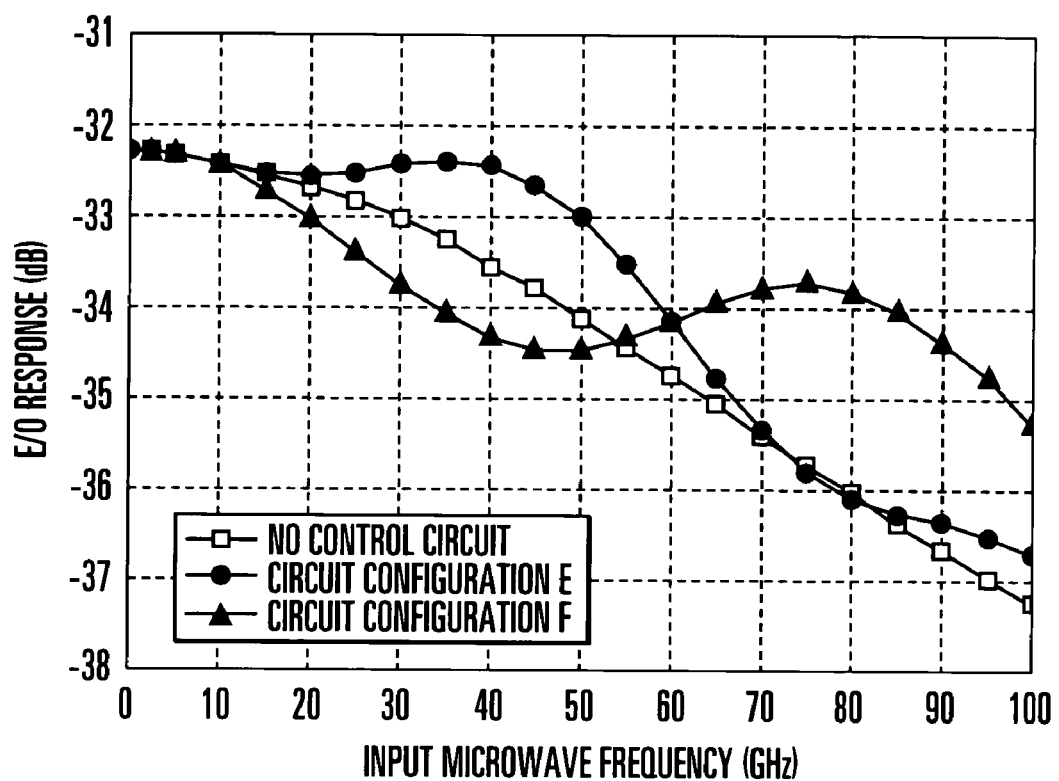
FIG. 14 is a graph showing the frequency dependence of the E/O response of the optical modulator when reflection control circuits of circuit configurations E and F are connected and not connected.

(L1, L2, Lstub)=(650 μm, 100 μm, 70 μm): circuit configuration E (L1, L2, Lstub)=(30 μm, 100 μm, 210 μm): circuit configuration F FIG. 14 shows the frequency characteristic simulation results of the E/O response. That is, FIG. 14 shows the frequency dependence of the E/O response of the optical modulator when the reflection control circuits RCNT of circuit configurations E and F are connected and not connected.

In this embodiment, when compared to the first and second embodiments, the two elements, i.e., the element connected in parallel and the element connected in series, are connected to the electrical signal line which connects the electrical/optical interaction region 11 of the optical modulation device 10 and an output terminating resistor, so the effect of improving the E/O response characteristic is more notable because the degree of freedom for controlling the reflection of an electrical signal increases.

For example, in circuit configuration E (indicated by solid circles in FIG. 14), the flatness improves without deteriorating the absolute value of the E/O response up to a frequency region of about 40 GHz. Also, in circuit configuration F (indicated by solid triangles in FIG. 14), the E/O response greatly improves even in an ultra-high-frequency region of about 100 GHz, and the 3-dB-down bandwidth in this case reaches 100 GHz.

The E/O response characteristic thus improves because the output reflection coefficient of an electrical signal is promoted as in the first and second embodiments.

Figure 15:
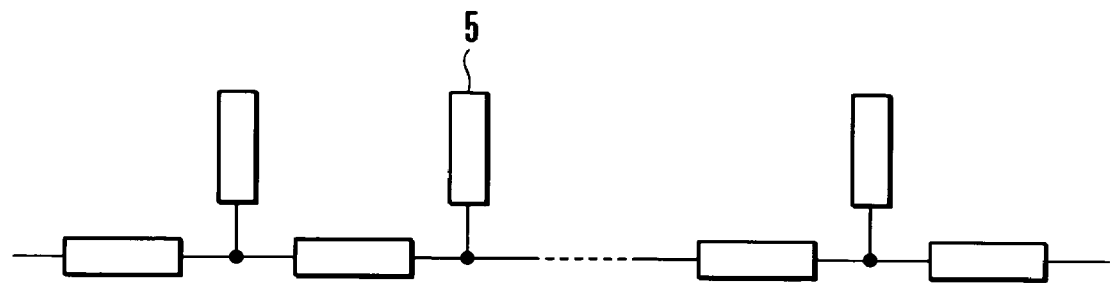
FIG. 15 is a schematic view of a circuit including multiple stages of reactance elements.

Note that although the only impedance component as a reflection control circuit to be connected in parallel is a reactance element in the first and second embodiments, a multistage arrangement in which two or more elements are connected in parallel as shown in FIG. 15 is also effective in order to increase the degree of freedom of design of the E/O response characteristic. FIG. 15 schematically shows a circuit including multiple stages of reactance elements.

When the number of reactance components connected in parallel increases as shown in FIG. 15, the degree of freedom for controlling (promoting) the reflection of an electrical signal increases by the increase in reactance components, and this increases the degree of freedom of design of the E/O response characteristic.

COMPARATIVE EXAMPLE 2

Figure 16:
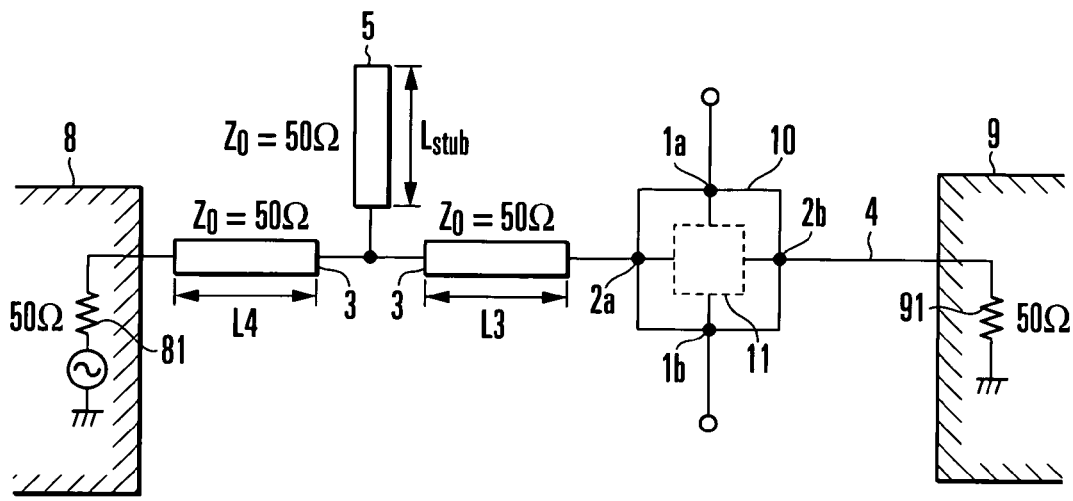
FIG. 16 is a view showing the arrangement of an optical modulator in which a reflection control circuit of circuit configuration G is connected.

In the first and third embodiments described above, the parallel reactance element as the reflection control circuit RCNT is connected to the electrical signal output side of the optical modulator. Therefore, an optical modulator in which a reflection control circuit RCNT of circuit configuration G having a parallel reactance element is connected to the electrical signal input side will be explained below. FIG. 16 shows the arrangement of the optical modulator in which the reflection control circuit RCNT of circuit configuration G is connected.

Note that in FIG. 16, the same reference numerals as in FIG. 1 denote the same components as the optical modulator shown in FIG. 1, and an explanation thereof will be appropriately omitted.

Figure 17:
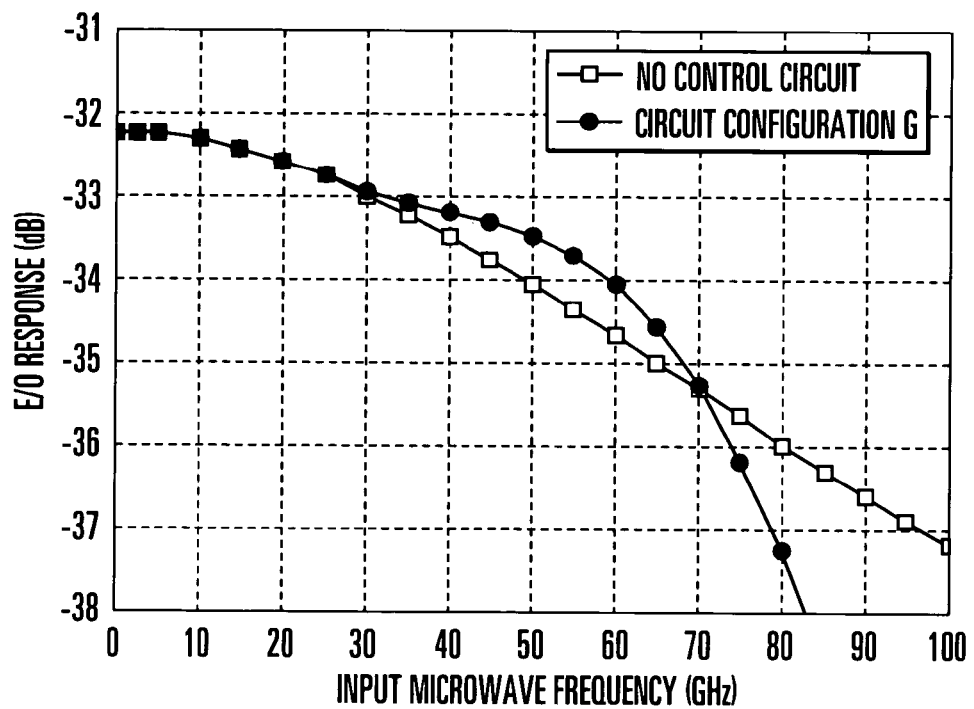
FIG. 17 is a graph showing the frequency dependence of the E/O response of the optical modulator when the reflection control circuit of circuit configuration G is connected and not connected.

FIG. 17 shows the frequency characteristic simulation results of the E/O response when the lengths of first electrical signal lines 3 and a reactance element (open-end stub) as the reflection control circuit RCNT formed by coplanar lines having characteristic impedance $Z_0=50 \ \Omega$ in FIG. 16 are set as follows. That is, FIG. 17 shows the frequency dependence of the E/O response of the optical modulator when the reflection control circuit RCNT of circuit configuration G is connected and not connected.

(L3, L4, Lstub)=(130 μm, 100 μm, 210 μm): circuit configuration G

As is well shown in FIG. 17, the E/O response can be improved even when the parallel reactance element is connected to the electrical signal input side of an optical modulation device 10, and the effect of improving the E/O response can be obtained in a frequency region of about 40 to 70 GHz in circuit configuration G.

Figure 18:
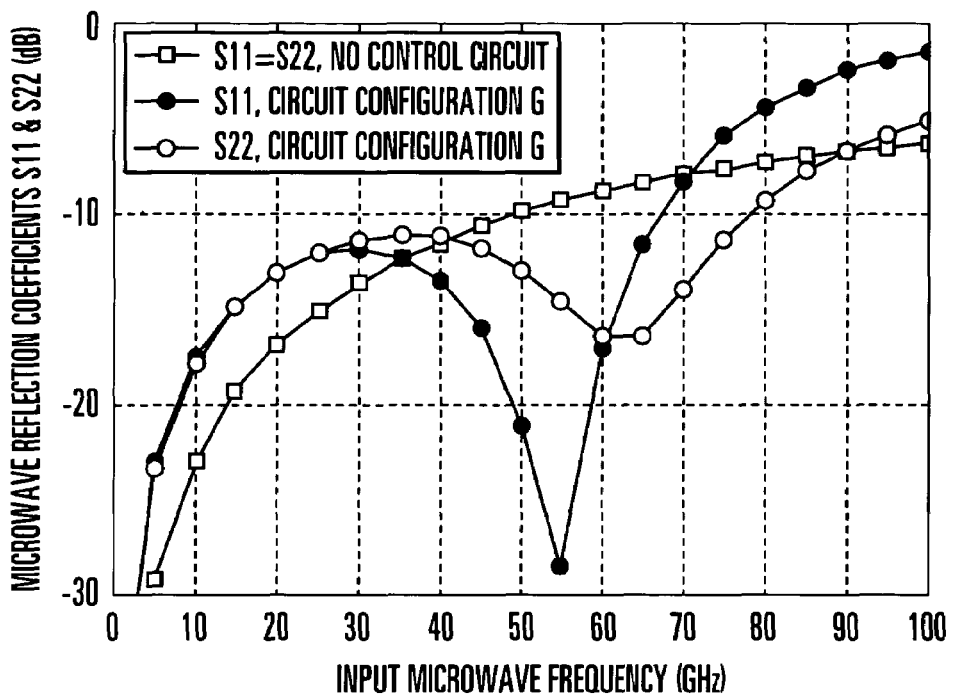
FIG. 18 is a graph showing the frequency dependence of the reflection coefficients of an electrical signal of the optical modulator when the reflection control circuit of circuit configuration G is connected and not connected.
Figure 19:
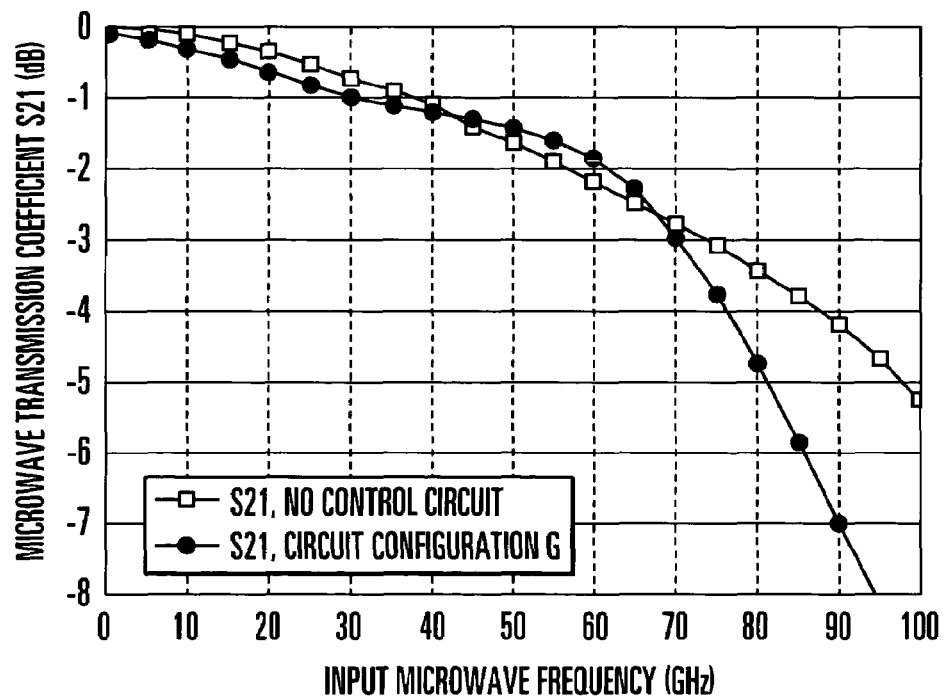
FIG. 19 is a graph showing the frequency dependence of the transmission coefficient of an electrical signal of the optical modulator when the reflection control circuit of circuit configuration G is connected and not connected.

FIGS. 18 and 19 show the frequency dependence of an input reflection coefficient S11 and output reflection coefficient S22 of an electrical signal and the frequency dependence of a transmission coefficient S21 of an electrical signal in the reflection control circuit RCNT of circuit configuration G. That is, FIG. 18 is a view showing the frequency dependence of the reflection coefficients of an electrical signal of the optical modulator when the reflection control circuit RCNT of circuit configuration G is connected and not connected, and FIG. 19 shows the frequency dependence of the transmission coefficient of an electrical signal of the optical modulator when the reflection control circuit RCNT of circuit configuration G is connected and not connected.

As is well shown in FIG. 18, in the frequency region of 40 to 70 GHz in which the E/O response improving effect is found in FIG. 17, the values of both S11 and S22 when the reflection control circuit RCNT of circuit configuration G is connected are smaller than those when the reflection control circuit RCNT is not connected, and this indicates that impedance matching is obtained in this frequency region.

Corresponding to this, as is well shown in FIG. 19, the value of S21 when the reflection control circuit RCNT of circuit configuration G is connected is larger than that when the reflection control circuit RCNT is not connected in the frequency region of 40 to 70 GHz. Accordingly, the improvement of the E/O response and the improvement of the transmission coefficient S21 of an electrical signal have an almost complete correspondence.

This phenomenon makes an extreme contrast with the case (first embodiment) in which the reflection control circuit RCNT of circuit configuration B which improves the E/O response by impedance mismatching. In circuit configuration B, the transmission coefficient S21 of an electrical signal evidently deteriorates in a frequency region where significant peaking is found in the E/O response characteristic (FIGS. 4 and 6).

The E/O response improving technique using impedance matching suppresses reflection at the input and output terminals of a modulation electrical signal, and efficiently transmits, to the output side, an electrical signal input to the optical modulator, thereby efficiently supplying the signal voltage to the electrical/optical interaction region in the optical modulator. As a consequence, the E/O response characteristic improves. Therefore, the design concept is substantially the same as that design concept of impedance matching in a normal electric circuit using transistors and the like, which improves the transmission coefficient S21, i.e., the gain of an electrical signal from the input side to the output side by suppressing the reflection of the electrical signal at the input and output terminals, and this design concept takes account only of an electrical signal which travels in (is transmitted through) the optical modulator.

On the other hand, the E/O response improving technique using impedance mismatching controls the application of a signal voltage to the optical modulator by superposing a transmitted (incident) electrical signal in the optical modulator and a reflected electrical signal generated by impedance mismatching, and hence has the advantage that the degree of freedom of design is much larger than that of the technique using impedance matching. In effect, in the arrangement (circuit configuration G) using impedance matching as shown in FIG. 16, the E/O response could be improved only to the degree shown in FIG. 17. By contrast, the arrangement using impedance mismatching shown in FIG. 1 (circuit configuration A or B) can largely change the E/O response characteristic as is well shown in FIG. 4.

COMPARATIVE EXAMPLE 3

Figure 20:
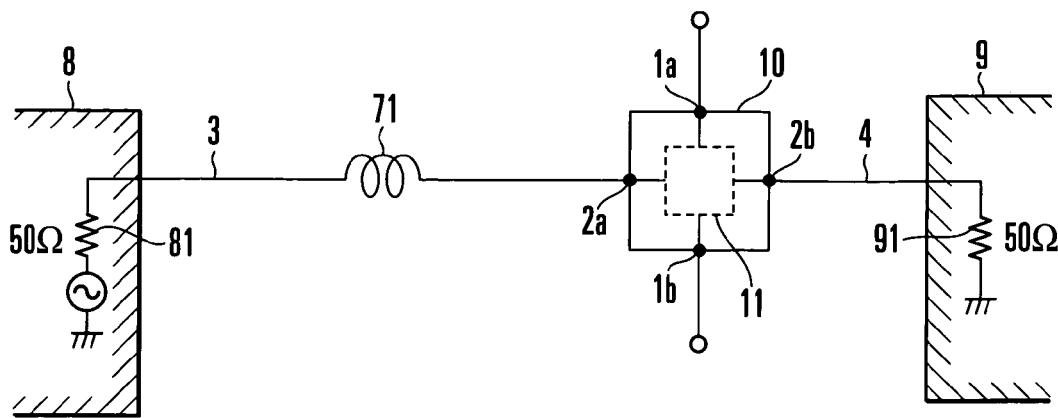
FIG. 20 is a view showing the arrangement of an optical modulator in which a reflection control circuit of circuit configuration H is connected.

In the second embodiment described earlier, the inductive reactance as the reflection control circuit RCNT is connected in series with the electrical signal output side of the optical modulation device 10. Therefore, an optical modulator in which circuit configuration H having an inductive reactance is connected to the electrical signal input side of an optical modulation device 10 will be explained below. FIG. 20 shows the arrangement of the optical modulator in which a reflection control circuit RCNT of circuit configuration H is connected.

Note that in FIG. 20, the same reference numerals as in FIG. 9 denote the same components as the optical modulator shown in FIG. 9, and an explanation thereof will be appropriately omitted.

Figure 21:
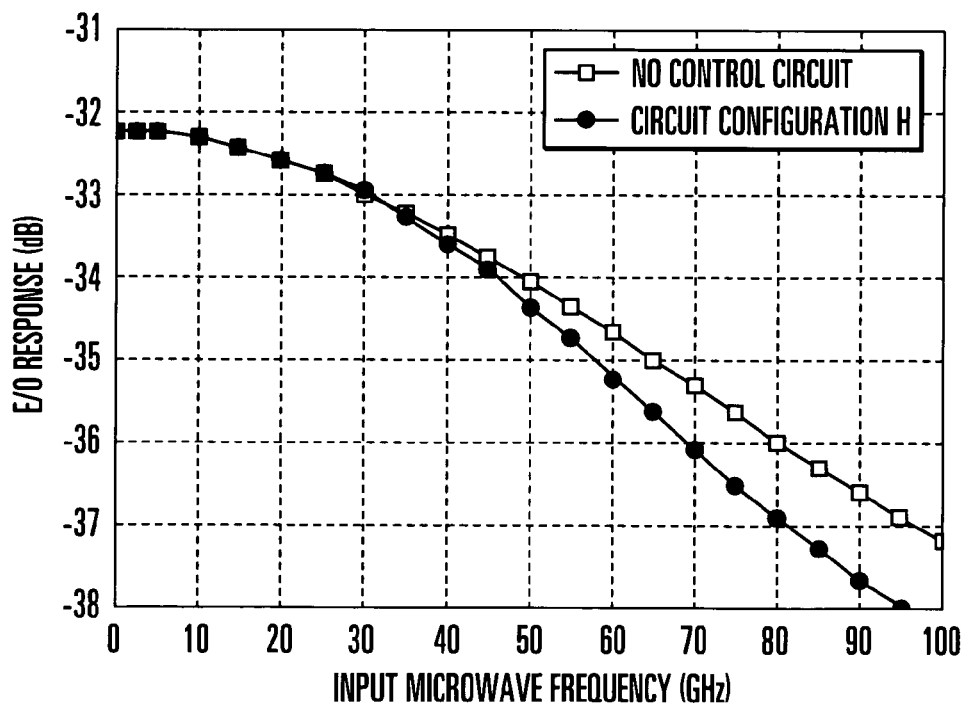
FIG. 21 is a graph showing the frequency dependence of the E/O response of the optical modulator when the reflection control circuit of circuit configuration H is connected and not connected.

FIG. 21 shows the frequency characteristic simulation results of the E/O response when the inductance value of an element 71 (an inductor) is L=0.04 nH. That is, FIG. 21 shows the frequency dependence of the E/O response of the optical modulator when the reflection control circuit RCNT of circuit configuration H is connected and not connected.

As is well shown in FIG. 21, when the inductive reactance is connected in series with the electrical signal input side of the optical modulation device 10, the E/O response deteriorates as the input microwave frequency increases. This is so because an impedance component indicated by $Z=+j\omega L$ which increases with an increase in frequency is connected to the electrical signal input side of the optical modulation device 10, so a microwave generated in an electrical signal driving system decays before it reaches an electrical/optical interaction region 11 in the optical modulation device 10.

Fourth Embodiment

The fourth embodiment of the present invention will be described below with reference to FIGS. 22A to 22C.

In this embodiment, a parallel electric resistance is connected as a reflection control circuit RCNT to an electrical signal line 4 which is connected to an electrical signal output terminal 2b of an optical modulation device 10.

Figure 22A:
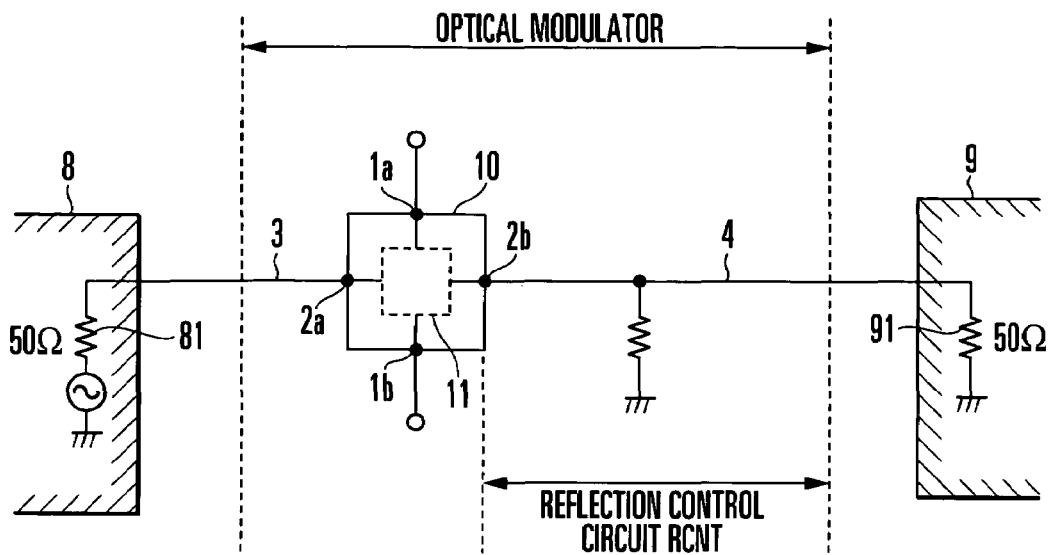
FIG. 22A is a view showing the arrangement of an optical modulator in which a reflection control circuit of circuit configuration I is connected.
Figure 22B:
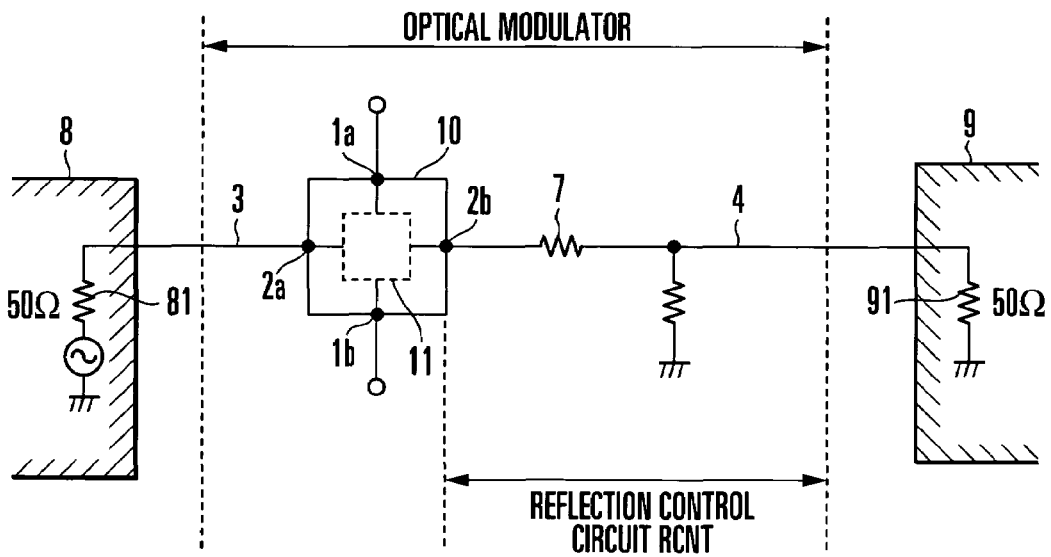
FIG. 22B is a view showing the arrangement of an optical modulator in which a reflection control circuit of circuit configuration J is connected.
Figure 22C:
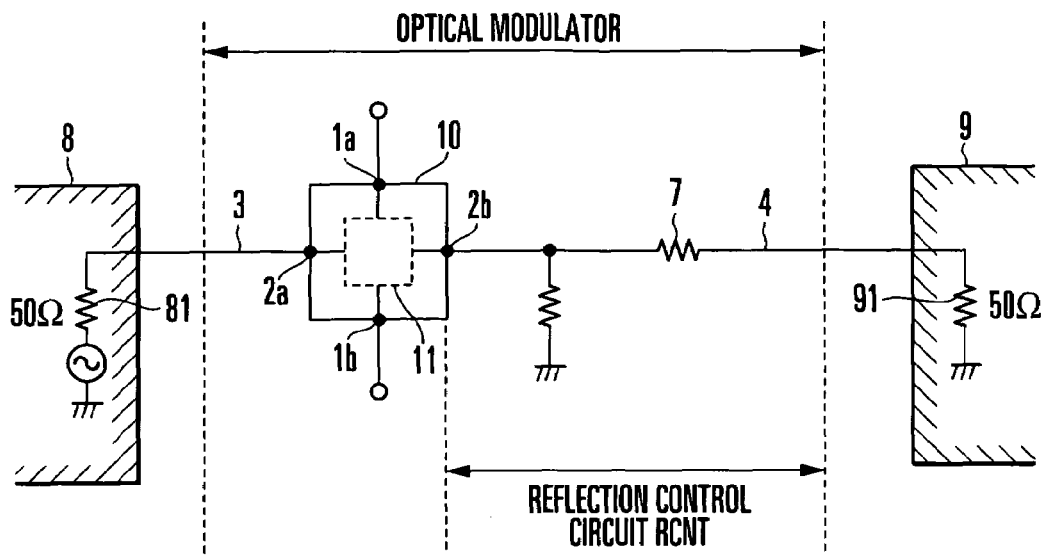
FIG. 22C is a view showing the arrangement of an optical modulator in which a reflection control circuit of circuit configuration K is connected.

FIGS. 22A, 22B, and 22C show the arrangements of optical modulators in which reflection control circuits RCNT of circuit configurations I, J, and K, respectively, are connected. Note that in FIG. 22, the same reference numerals as in FIG. 1 denote the same components as the optical modulator shown in FIG. 1, and an explanation thereof will be appropriately omitted. Note also that in FIG. 22, both the values of an input terminating resistor 81 and output terminating resistor 91 are 50Ω.

In the reflection control circuit RCNT of circuit configuration I shown in FIG. 22A, a parallel electric resistance as the reflection control circuit RCNT is connected between a second electrical signal line 4 and ground.

In the reflection control circuit RCNT of circuit configuration J shown in FIG. 22B, in addition to a parallel electric resistance, a series electric resistance 7 is connected to that portion of an electrical signal line 4, which is closer to an optical modulation device 10 than the parallel electric resistance, as a reflection control circuit 5.

In the control circuit of circuit configuration K shown in FIG. 22C, in addition to a parallel electric resistance as the reflection control circuit RCNT, a series electric resistance is connected to that portion of an electrical signal line 4, which is closer to an output terminating resistor than the parallel electric resistance.

Figure 23:
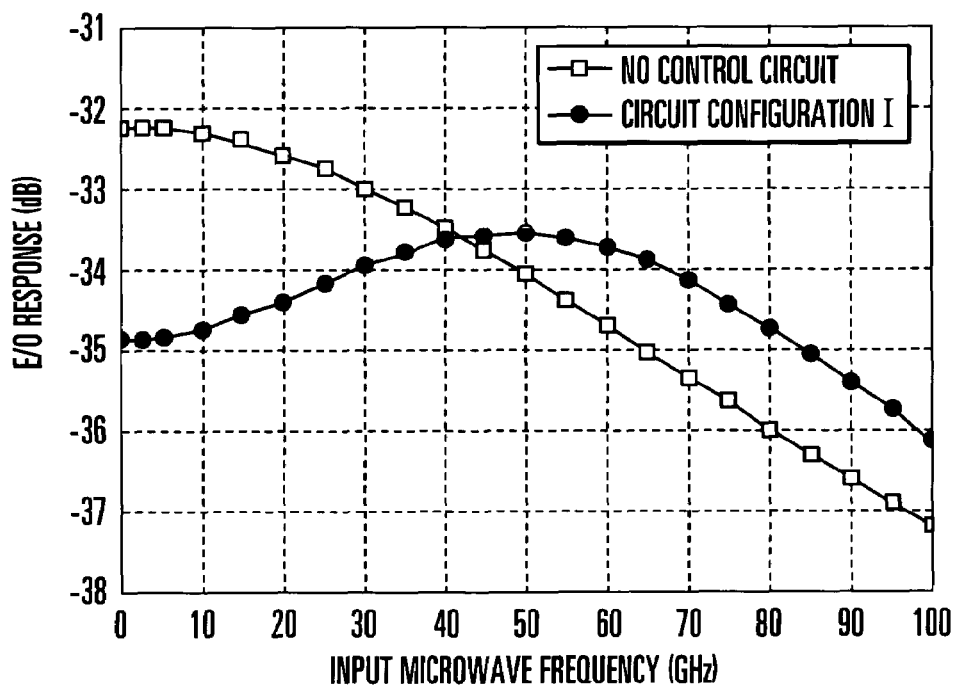
FIG. 23 is a graph showing the frequency dependence of the E/O response of the optical modulator when the reflection control circuit of circuit configuration I is connected and not connected.

FIG. 23 shows the frequency characteristic simulation results of the E/O response characteristic in circuit configuration I shown in FIG. 22A, together with the E/O response characteristic of the optical modulation device itself when the reflection control circuit RCNT is not connected. That is, FIG. 23 shows the frequency dependence of the E/O response of the optical modulator when the reflection control circuit RCNT of circuit configuration I is connected and not connected. Note that in this simulation, the same optical modulation device 10 as in the first embodiment was assumed, and the value of the parallel electric resistance of the reflection control circuit RCNT was set at 67 Ω.

As is well shown in FIG. 23, when the parallel electric resistance is connected as the reflection control circuit RCNT to the electrical signal output side of the optical modulation device 10, it is possible to decrease the absolute value of the E/O response on the low-frequency side and increase the absolute value of the E/O response on the high-frequency side, while the value of the terminating resistor is maintained at 50 Ω, thereby greatly improving the flatness of the frequency characteristic. In the conventional technique, the value of the output terminating resistor (load resistor) itself must be decreased in order to improve the flatness of the frequency characteristic of the E/O response. In this embodiment, however, the addition of the parallel resistance obviates the need to change the impedance of the electrical signal driving system from 50 Ω as a standard value.

Figure 24:
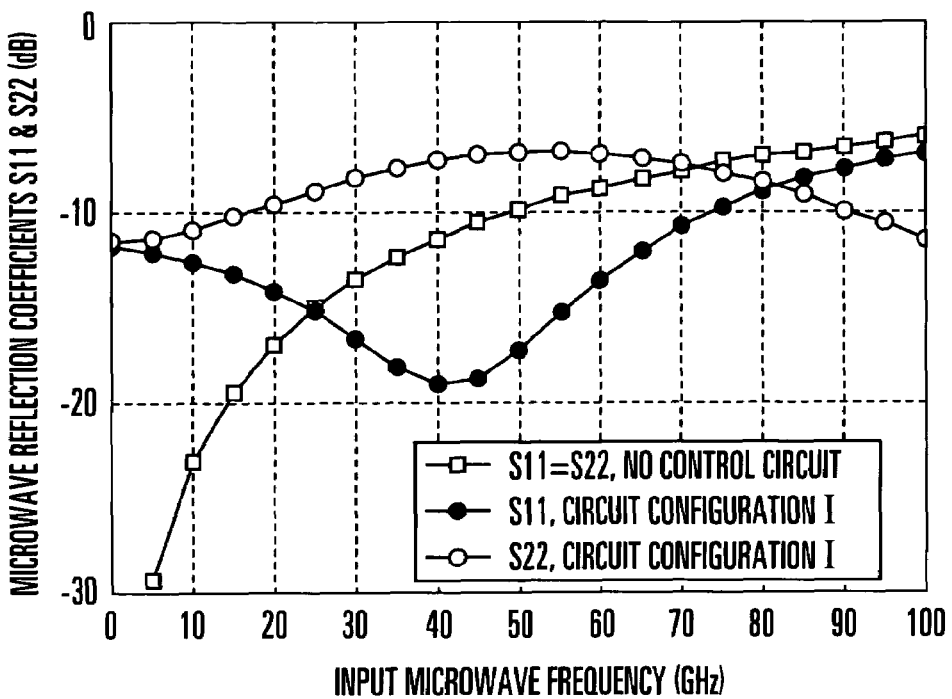
FIG. 24 is a graph showing the frequency dependence of the reflection coefficients of an electrical signal of the optical modulator when the reflection control circuit of circuit configuration I is connected and not connected.

FIG. 24 shows the frequency dependence of an input reflection coefficient S11 and output reflection coefficient S22 of an electrical signal in circuit configuration I, together with the reflection coefficients when the reflection control circuit RCNT is not connected. That is, FIG. 24 shows the frequency dependence of the reflection coefficients of an electrical signal of the optical modulator when the reflection control circuit RCNT of circuit configuration I is connected and not connected. When the reflection control circuit RCNT is not connected, the device structure is symmetrical with respect to the input and output, so S11=S22.

In the circuit using the optical modulation unit, unlike in a normal electric circuit using transistors and the like, the input reflection coefficient S11 can be controlled although the reflection control circuit RCNT is connected only to the electrical signal output side. As is well shown in FIG. 24, in a region where the input microwave frequency is about 40 GHz or less, the value of S11 when the reflection control circuit (circuit configuration I) is connected is opposite to that in the case in which the reflection control circuit RCNT is not connected, i.e., decreases as the frequency increases. Especially in a region of about 25 GHz or less, the reflection of an electrical signal on the input side is promoted by connecting the reflection control circuit RCNT.

In contrast, as shown in FIG. 23, the E/O response when the reflection control circuit (circuit configuration I) is connected increases as the frequency increases in a region of about 40 GHz or less.

As described above, in circuit configuration I in which the parallel electric resistance alone is connected as the reflection control circuit RCNT to the electrical signal output side of the optical modulation device 10, the flatness of the frequency characteristic of the E/O response can be improved, but the absolute value of the E/O response decreases on the low-frequency side.

Figure 25:
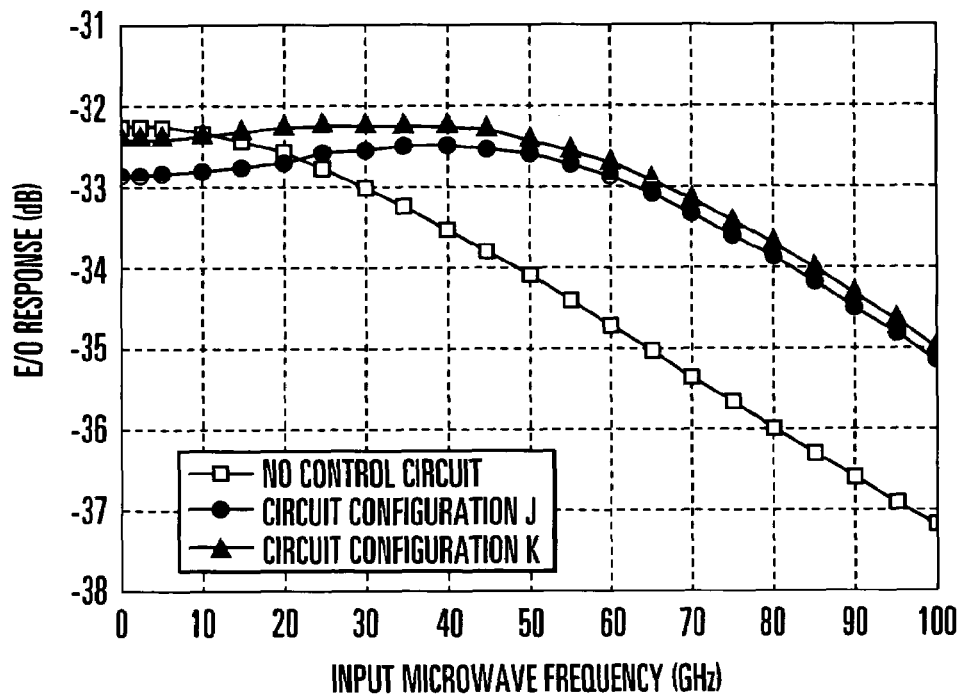
FIG. 25 is a graph showing the frequency dependence of the E/O response of the optical modulator when the reflection control circuits of circuit configurations J and K are connected and not connected.

In contrast to circuit configuration I in which only the parallel electric resistance is connected as the reflection control circuit RCNT to the electrical signal output side of the optical modulation device 10, the characteristics including the absolute value of the E/O response characteristic can be improved by connecting the series electric resistance 7 in addition to the parallel electric resistance as in circuit configurations J and K. FIG. 25 shows the E/O response simulation results of circuit configurations J and K. That is, FIG. 25 shows the frequency dependence of the E/O response of the optical modulators when the reflection control circuits RCNT of circuit configurations J and K are connected and not connected.

Note that in the simulation shown in FIG. 25, the value of the parallel electric resistance as the reflection control circuit RCNT of each of circuit configurations J and K is 67 Ω, i.e., the same value as in circuit configuration I, the value of the series electric resistance 7 of circuit configuration J is 5 Ω, and the value of the series electric resistance 7 of circuit configuration K is 25Ω.

As is well shown in FIG. 25, when the series electric resistance 7 is used in addition to the parallel electric resistance as the reflection control circuit RCNT, it is possible to improve the E/O response characteristics, particularly the flatness, including the absolute value of the E/O response, and increase the 3-dB-down bandwidth, while the value of the terminating resistor is maintained at 50 Ω.

COMPARATIVE EXAMPLE 4

Figure 26:
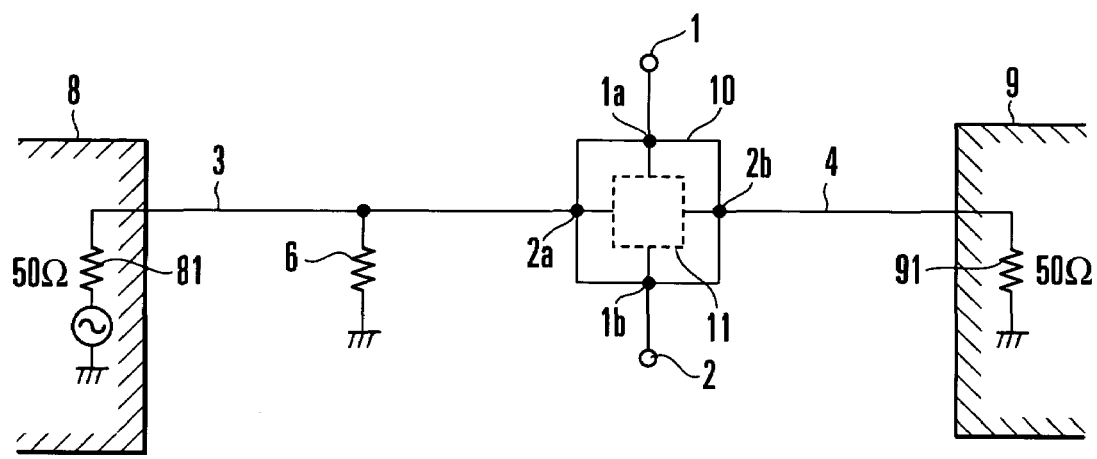
FIG. 26 is a view showing the arrangement of an optical modulator in which a reflection control circuit of circuit configuration M is connected.

In the above fourth embodiment, the electric resistance is connected in parallel to the electrical signal output side of the optical modulation device 10. Therefore, an optical modulator in which a reflection control circuit RCNT of circuit configuration M having an electric resistance is connected to the electrical signal input side of an optical modulation device 10 will be explained below. FIG. 26 shows the arrangement of the optical modulator in which the reflection control circuit RCNT of circuit configuration M is connected.

Note that in FIG. 26, the same reference numerals as in FIG. 22 denote the same components as the optical modulator shown in FIG. 22, and an explanation thereof will be appropriately omitted.

Figure 27:
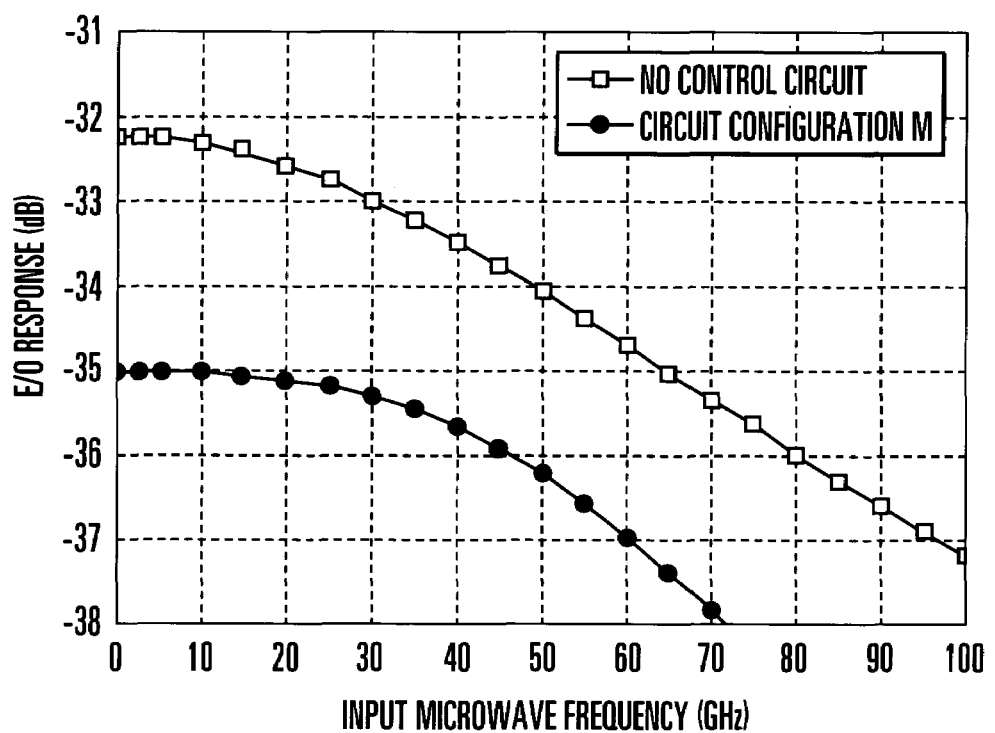
FIG. 27 is a graph showing the frequency dependence of the E/O response of the optical modulator when the reflection control circuit of circuit configuration M is connected and not connected.

FIG. 27 shows the frequency characteristic simulation results of the E/O response when the value of the parallel electric resistance as the reflection control circuit RCNT is 67 Ω. That is, FIG. 27 shows the frequency dependence of the E/O response of the optical modulator when the reflection control circuit RCNT of circuit configuration M is connected and not connected.

As is well shown in FIG. 27, when the parallel electric resistance is connected as the reflection control circuit RCNT to the electrical signal input side of the optical modulation device 10, the absolute value of the E/O response largely decreases, so this arrangement is unsuitable for an actual system. The E/O response thus deteriorates because the electric resistance component is connected to the electrical signal input side of the optical modulation device 10, so a microwave generated in an electrical signal driving system decays before reaching an electrical/optical interaction region 11 in the optical modulation device 10, and no signal voltage is effectively applied to the electrical/optical interaction region 11.

Fifth Embodiment

The fifth embodiment of the present invention will be described below with reference to FIG. 28.

This embodiment is equivalent to an arrangement in which an electric resistance is connected in parallel to and an inductive reactance is connected in series with the electrical signal output side of an optical modulator, i.e., equivalent to a combination of the second and fourth embodiments.

Figure 28:
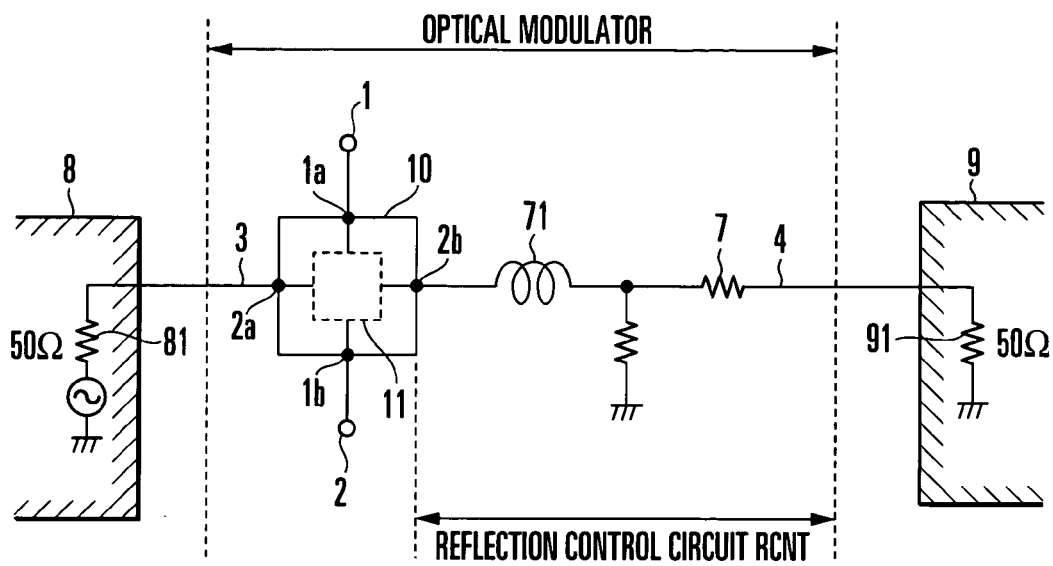
FIG. 28 is a view showing the arrangement of an optical modulator according to the fifth embodiment.

FIG. 28 shows the arrangement of the optical modulator according to this embodiment. Note that in FIG. 28, the same reference numerals as in FIGS. 9 and 22 denote the same components as the optical modulators shown in FIGS. 9 and 22, and an explanation thereof will be appropriately omitted.

Referring to FIG. 28, an element 71 connected in series with a second electrical signal line 4 is an inductor. Letting L be the inductance value and ω be the angular frequency, the element 71 has an inductive reactance component of +ωL. Also, a parallel electric resistance and a series electric resistance 7 as the reflection control circuit RCNT are connected to that portion of the second electrical signal line 4, which is closer to an output terminating resistor than the element 71. This circuit configuration will be referred to as circuit configuration N hereinafter.

Figure 29:
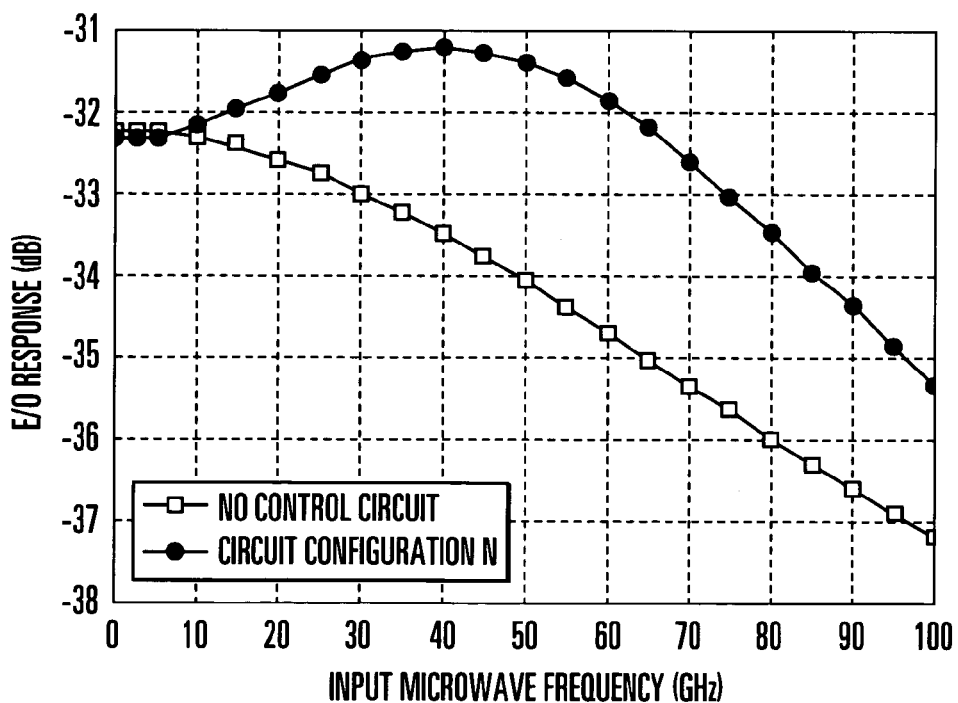
FIG. 29 is a graph showing the frequency dependence of the E/O response of the optical modulator when a reflection control circuit of circuit configuration N is connected and not connected.
Figure 30:
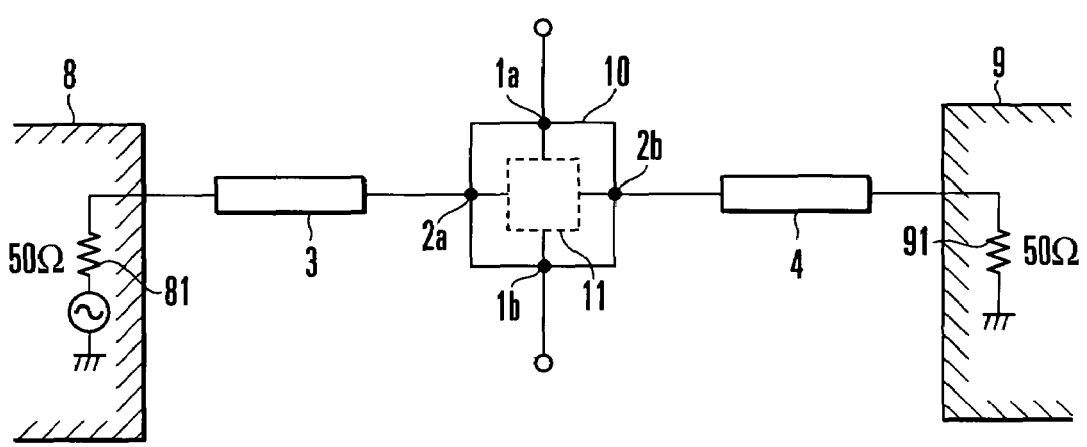
FIG. 30 is a view showing the arrangement of a conventional optical modulator.

FIG. 29 shows the frequency characteristic simulation results of the E/O response when the inductance value of the element 71 is L=0.04 nH and the values of the parallel electric resistance and series electric resistance 7 as the reflection control circuit RCNT are 67 and 25 Ω, respectively, in the optical modulator in which circuit configuration N shown in FIG. 28 is connected. That is, FIG. 29 shows the frequency dependence of the E/O response of the optical modulator when the reflection control circuit RCNT of circuit configuration N is connected and not connected.

In circuit configuration N as is well shown in FIG. 29, the E/O response characteristic including its absolute value can be greatly improved, and the E/O response peaking effect is found over an extremely wide frequency region centering around about 40 GHz. When peaking like this can be realized, even in a case in which, for example, the output voltage amplitude of a driver circuit which electrically drives an optical modulator decreases with an increase in frequency, the optical output from the optical modulator can be advantageously equalized up to a frequency region of about 40 GHz.

Note that the series electric resistance 7 is connected in circuit configuration N shown in FIG. 28, but the same effect can be obtained even if this series electric resistance is not connected.

Note also that the E/O response characteristic increases with an increase in frequency in the low-frequency region in FIG. 29 primarily due to the profile of an input reflection coefficient S11 of an electrical signal as in the fourth embodiment.

Although the present invention has been explained above by way of its first to fifth embodiments, it is, of course, also possible to freely combine these embodiments. Also, the optical modulation device is explained by taking an electroabsorption modulator as an example in each of the first to fifth embodiments, but the present invention is applicable to an optical modulation device based on another operation mechanism, e.g., a Mach-Zehnder optical modulation device using the refractive index change of the material. This is so because the present invention relates to control of an electrical signal supplied to the electrical/optical interaction region of the optical modulation device, rather than the operation mechanism in the electrical/optical interaction region.

The invention claimed is:

1. An optical modulator characterized by comprising:
an optical modulation device having optical signal input and output terminals, electrical signal input and output terminals, and an electrical/optical interaction region in which input optical and electrical signals interact with each other;
an electrical signal line connected to said electrical signal output terminal; and
a refection control circuit connected to said electrical signal line,
said reflection control circuit comprising an impedance element which positively reflects the electrical signal output from said interaction region of said optical modulation device.

2. An optical modulator according to claim 1, characterized in that said impedance element is a reactance element connected between said electrical signal line and ground.

3. An optical modulator according to claim 2, characterized in that said reactance element is an element having a stub structure.

4. An optical modulator according to claim 2, characterized in that said reflection control circuit further comprises another impedance element connected in series with said electrical signal line which extends from said optical modulation device.

5. An optical modulator according to claim 4, characterized in that said impedance element connected in series with said electrical signal line is an inductive reactance.

6. An optical modulator according to claim 2, characterized in that said electrical signal line is connected to an output terminating resistor.

7. An optical modulator according to claim 6, characterized in that a resistance value of said output terminating resistor connected to said electrical signal line is 50 Ω.

8. An optical modulator according to claim 6, characterized in that an input terminating resistor of an electrical signal driving system connected to an electrical signal line which inputs an electrical signal to said interaction region and said output terminating resistor have equal resistance values.

9. An optical modulator according to claim 1, characterized in that said impedance element of said reflection control circuit is an inductive reactance connected in series with said electrical signal line.

10. An optical modulator according to claim 1, characterized in that said impedance element of said reflection control circuit is an electric resistance connected between said electrical signal line and ground.

11. An optical modulator according to claim 10, characterized in that said reflection control circuit further comprises another electric resistance connected in series with said electrical signal line which extends from said optical modulation device.

12. An optical modulator according to claim 10, characterized in that said electrical signal line is connected to an output terminating resistor.

13. An optical modulator according to claim 12, characterized in that a resistance value of said output terminating resistor connected to said electrical signal line is 50 Ω.

14. An optical modulator according to claim 12, characterized in that an input terminating resistor of an electrical signal driving system connected to an electrical signal line which inputs an electrical signal to said interaction region and said output terminating resistor have equal resistance values.

15. An optical modulation method characterized by using:
an optical modulation device having optical signal input and output terminals, electrical signal input and output terminals, and an electrical/optical interaction region in which input optical and electrical signals interact with each other;
an electrical signal line connected to the electrical signal output terminal; and
a refection control circuit connected to the electrical signal line, and
modulating the input optical signal by a superposed electrical signal obtained by positively reflecting the electrical signal output from the interaction region of the optical modulation-device by the reflection control circuit comprising an impedance element, and superposing a generated reflected electrical signal and the input electrical signal.

16. An optical modulation method according to claim 15, characterized in that the impedance element of the reflection control circuit is a reactance element connected between the electrical signal line and ground.

* * * * *

UNITED STATES PATENT AND TRADEMARK OFFICE
CERTIFICATE OF CORRECTION

PATENT NO. : 7,345,803 B2
APPLICATION NO. : 10/547906
DATED : March 18, 2008
INVENTOR(S) : Nakajima et al.

It is certified that error appears in the above-identified patent and that said Letters Patent is hereby corrected as shown below:

Column 18, Claim 1, line 36, delete "refection" insert -- reflection --
Column 20, Claim 15, line 9, delete "refection" insert -- reflection --

Signed and Sealed this

Thirteenth Day of July, 2010

David J. Kappos
*Director of the United States Patent and Trademark Office*